US010979887B2

(12) United States Patent
Yu et al.

(10) Patent No.: US 10,979,887 B2
(45) Date of Patent: Apr. 13, 2021

(54) ACCESS METHOD, NETWORK DEVICE, TERMINAL DEVICE, AND AMF DEVICE

(71) Applicant: HUAWEI TECHNOLOGIES CO., LTD., Guangdong (CN)

(72) Inventors: Fang Yu, Beijing (CN); Hui Ni, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 16/588,279

(22) Filed: Sep. 30, 2019

(65) Prior Publication Data

US 2020/0029200 A1 Jan. 23, 2020

Related U.S. Application Data

(63) Continuation of application No. PCT/CN2017/079236, filed on Apr. 1, 2017.

(51) Int. Cl.
*H04W 8/06* (2009.01)
*H04W 8/20* (2009.01)
*H04W 8/24* (2009.01)

(52) U.S. Cl.
CPC .............. *H04W 8/065* (2013.01); *H04W 8/20* (2013.01); *H04W 8/24* (2013.01)

(58) Field of Classification Search
CPC .......... H04W 8/065; H04W 8/20; H04W 8/24
See application file for complete search history.

(56) References Cited

U.S. PATENT DOCUMENTS

2017/0086118 A1    3/2017   Vrzic
2017/0245316 A1*   8/2017   Salkintzis ............. H04W 48/16
(Continued)

FOREIGN PATENT DOCUMENTS

| CN | 105101345 A | 11/2015 |
| CN | 105813195 A | 7/2016 |

(Continued)

OTHER PUBLICATIONS

3GPP TS 23.501 V0.3.0 (Feb. 2017), 3rd Generation Partnership Project Technical Specification Group Services and System Aspects; System Architecture for the 5G System; Stage 2(Release 15), 97 pages.

(Continued)

*Primary Examiner* — Muthuswamy G Manoharan
(74) *Attorney, Agent, or Firm* — Womble Bond Dickinson (US) LLP

(57) ABSTRACT

Embodiments of the application provide an access method, including: obtaining, by a network device, first information, where the first information is used to indicate a slice/service type (SST) of a slice that is allowed to be accessed by a terminal device and a radio access technology (RAT) type that is allowed to be used when the terminal device accesses the slice that is allowed to be accessed; obtaining, by the network device, second information, where the second information is used to indicate an SST of a slice connected to an access and mobility management function (AMF) device and a RAT type supported by the slice connected to the AMF device; and selecting, by the network device based on the first information and the second information, a first AMF device that serves the terminal device.

19 Claims, 11 Drawing Sheets

(56) References Cited

U.S. PATENT DOCUMENTS

2018/0352501 A1* 12/2018 Zhang .................. H04W 48/18
2019/0124597 A1* 4/2019 Martin .................. H04W 36/30

FOREIGN PATENT DOCUMENTS

CN          106412905 A     2/2017
CN          106549806 A     3/2017

OTHER PUBLICATIONS

Ericsson: "Slicing for Lte connected to 5G-CN",3GPP Draft; R2-1702558,Mar. 24, 2017,,total 4 pages.
3GPP TS 23.501 V0.3.1:"3rd Generation Partnership Project;Technical Specification Group Services and System Aspects;System Architecture for the 5G System;Stage 2(Release 15)",Mar. 2017,total 97 pages.
3GPP TR 33.899 V1.0.0:"3rd Generation Partnership Project;Technical Specification Group Services and System Aspects; Study on the security aspects of the next generation system aspects of the next generation system(Release 14)",Mar. 9, 2017,total 472 pages.
3GPP TS 23.502 V0.2.0:"3rd Generation Partnership Project;Technical Specification Group Services and System Aspects;Procedures for the 5G System;Stage 2(Release 15)",Feb. 2017,total 71pages.
ZTE: "Some Issues with NW Slicing in Multiple Connectivity Contexts",3GPP Draft; R3-162122, Oct. 1, 2016,total 4 pages.
Nokia ZTE Telecom Italia Kddi Interdigital Samsung ETRI KPN: "Network slicing way forward",3GPP Draft; S2-165696,Oct. 11, 2016,total 16 pages.
Ericsson: "Discussion on the need to send policies to the UE",3GPP Draft; S2-165535,Oct. 11, 2016,total 4 pages.

* cited by examiner

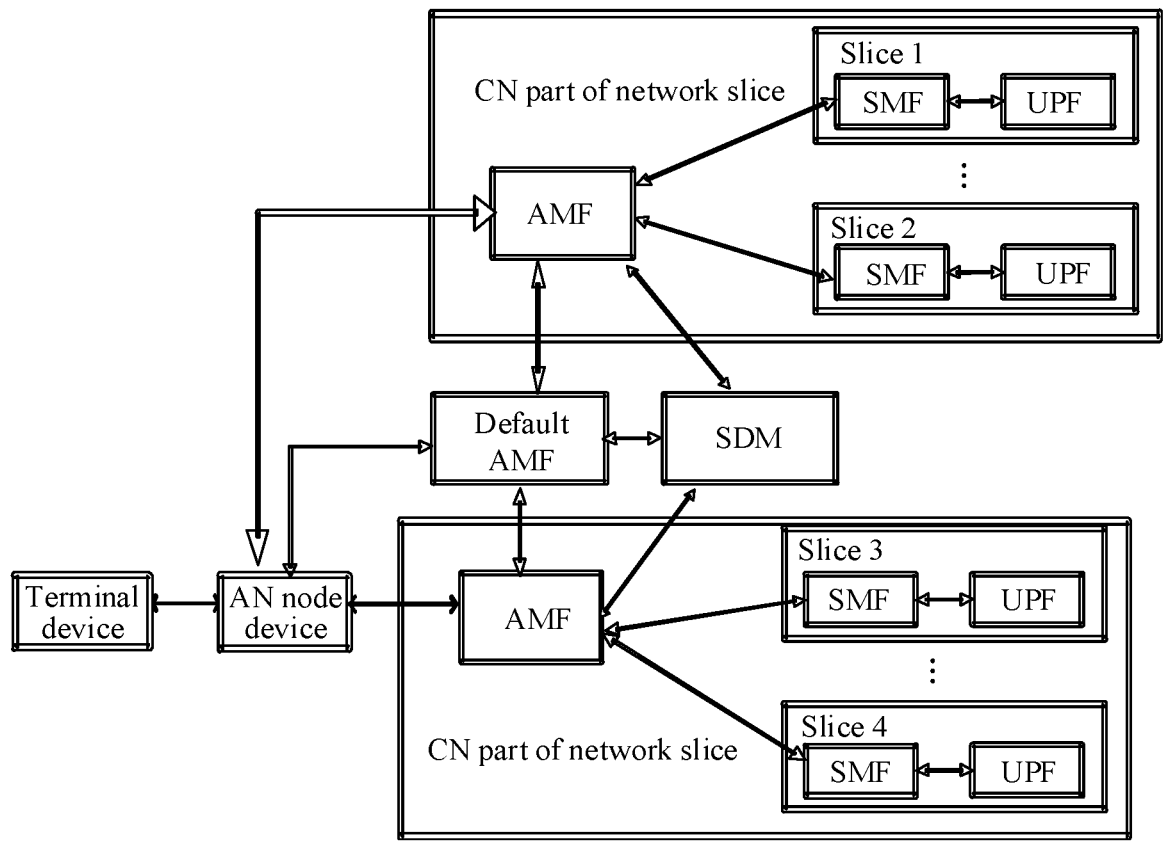

FIG. 3

A network device obtains first information, where the first information is used to indicate an SST of a slice that is allowed to be accessed by a terminal device and a RAT type that is allowed to be used when the terminal device accesses the slice that is allowed to be accessed — S101

The network device obtains second information, where the second information is used to indicate an SST of a slice connected to an AMF device and a RAT type supported by the connected slice — S102

The network device selects, for the terminal device based on the first information and the second information, a first AMF device that serves the terminal device — S103

FIG. 4

ACCESS METHOD, NETWORK DEVICE, TERMINAL DEVICE, AND AMF DEVICE

CROSS-REFERENCE TO RELATED APPLICATIONS

This application is a continuation of International Application No. PCT/CN2017/079236, filed on Apr. 1, 2017, the disclosure of which is herein incorporated by reference in its entirety.

TECHNICAL FIELD

Embodiments of the application relate to communications technologies, and in particular, to an access method, a network device, a terminal device, and a mobility management function (AMF) device.

BACKGROUND

A network slice is a new network mode and service mode. A plurality of virtual networks may be obtained through slicing on a same set of broadband network hardware infrastructure by using a network slicing technology. Each virtual network is one network slice. Network slices are logically isolated, so that an operator can customize a network function for each network slice based on a requirement of a service scenario. In this way, a plurality of services can share one set of broadband network hardware infrastructure, and the services can be independent of each other at the same time. Therefore, a terminal device may access different network slices based on a service requirement of the terminal device. A network slice defined in the 3rd generation partnership project (3GPP) is an end-to-end network, and consists of an access network, a core network, and a transmission network. A "core network slice" may be considered as an instantiated core network architecture. Currently, an example "core network slice" considered in the industry includes mobile broadband, multimedia, massive machine type communications (mMTC), critical machine type communication (cMTC), and the like.

Currently, the terminal device may access, by using an AMF device, a core network slice connected to the AMF device. Because different AMF devices may be connected to different core network slices, an access network (AN) node device connected to the terminal device may select, based on network slice selection assistance information (NSSAI) of the terminal device, a to-be-accessed AMF device for the terminal device. The NSSAI may include information about a slice/service type (SST) supported by the terminal device. In this way, when transmitting different services, the terminal device may access, by using the AMF device selected by the AN node device, core network slices corresponding to the services, to transmit the services by using the core network slices.

However, based on the foregoing method, the AMF device selected by the AN node device may not meet a requirement for actual use of the terminal device. The following case occurs: An AMF device is reselected in a communication process of the terminal device. Consequently, signaling overheads are relatively large, and communication efficiency is relatively low.

SUMMARY

This application provides an access method, a network device, a terminal device, and an AMF device, to resolve a prior-art technical problem in the following: An AMF device selected by an AN node device cannot meet a requirement of a terminal device in actual use, and an AMF device needs to be reselected in a communication process of the terminal device, causing relatively high signaling overheads and relatively low communication efficiency.

According to a first aspect, this application provides an access method. The method includes:

obtaining, by a network device, first information, where the first information is used to indicate a slice/service type SST of a slice that is allowed to be accessed by a terminal device and a radio access technology RAT type that is allowed to be used when the terminal device accesses the slice that is allowed to be accessed;

obtaining, by the network device, second information, where the second information is used to indicate an SST of a slice connected to an access and mobility management function AMF device and a RAT type supported by the slice connected to the AMF device; and selecting, by the network device based on the first information and the second information, a first AMF device that serves the terminal device.

According to the access method provided in the first aspect, when the network device selects an AMF device for the terminal device, not only the SST of the slice that is allowed to be accessed by the terminal device needs to be considered, but also the RAT type that is allowed to be used when the terminal device accesses the slice that is allowed to be accessed needs to be considered, so that a first AMF that is selected by the network device for the terminal device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed in a communication process of the terminal device. Therefore, according to the method in this application, a probability of reselecting an AMF for the terminal device can be reduced, thereby reducing signaling overheads and improving communication efficiency.

In one embodiment, the network device is an access network node device, and the obtaining, by a network device, first information includes:

obtaining, by the network device, first network slice selection assistance information from the terminal device, where the first network slice selection assistance information includes the first information; or obtaining, by the network device, second network slice selection assistance information from a second AMF device, where the second network slice selection assistance information includes the first information.

According to the access method provided in the embodiment, the network device obtains the first information in various flexible manners, so that the network device can select an AMF for the terminal device based on the SST of the slice that is allowed to be accessed by the terminal device and the RAT type that is allowed to be used when the terminal device accesses the slice that is allowed to be accessed. In this way, a probability of reselecting an AMF for the terminal device can be reduced, thereby reducing signaling overheads and improving communication efficiency.

In one embodiment, the obtaining, by the network device, first network slice selection assistance information from the terminal device includes:

receiving, by the network device, a first request message from the terminal device, where the first request message carries the first network slice selection assistance information, and the first network slice selection assistance information is configured network slice selection assistance information or accepted network slice selection assistance information.

According to the access method provided in the embodiment, after receiving the first request message of the terminal device, the network device may select the to-be-accessed first AMF for the terminal device based on the first information included in the first NSSAI carried in the first request message. In this way, a probability of reselecting an AMF for the terminal device can be reduced, thereby reducing signaling overheads and improving communication efficiency.

In one embodiment, the second network slice selection assistance information is accepted network slice selection assistance information.

In one embodiment, the obtaining, by the network device, second information includes:

obtaining, by the network device, the second information from the AMF device; or obtaining, by the network device, the second information from an access network domain management device.

According to the access method provided in the embodiment, the network device obtains the second information in various flexible manners, so that the network device can select an AMF for the terminal device based on the SST of the slice that is allowed to be accessed by the terminal device, the RAT type that is allowed to be used when the terminal device accesses the slice that is allowed to be accessed, the SST of the slice connected to the AMF device, and the RAT type supported by the slice connected to the AMF device. In this way, a probability of reselecting an AMF for the terminal device can be reduced, thereby reducing signaling overheads and improving communication efficiency.

In one embodiment, the network device is a second AMF device, and the obtaining, by a network device, first information includes:

obtaining, by the network device, subscription information of the terminal device from a subscription database; and determining, by the network device, the first information based on the subscription information of the terminal device.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the selecting, by the network device based on the first information and the second information, a first AMF device that serves the terminal device includes:

matching, by the network device, the first information and the second information, and selecting, as the first AMF device, an AMF device that supports the SST of the slice that is allowed to be accessed by the terminal device and the RAT type that is allowed to be used when the terminal device accesses the SST of the slice that is allowed to be accessed.

According to a second aspect, this application provides an access method. The method includes:

receiving, by an access and mobility management function AMF device from an access network node device, a first request message sent by a terminal device, where the first request message carries an identifier of the terminal device;

obtaining, by the AMF device from a subscription database based on identification information of the terminal device, subscription information corresponding to the identifier of the terminal device;

determining, by the AMF device based on the subscription information, a slice/service type SST of a slice that is allowed to be accessed by the terminal device and a radio access technology RAT type that is allowed to be used when the terminal device accesses the slice that is allowed to be accessed; and sending, by the AMF device, a first acceptance message to the terminal device, where the first acceptance message includes the SST of the slice that is allowed to be accessed by the terminal device and the RAT type that is allowed to be used when the terminal device accesses the slice that is allowed to be accessed.

According to the access method provided in the second aspect, after receiving the first request message of the terminal device, in a process of authenticating the terminal device based on the subscription information obtained from the subscription database, the AMF device may determine, based on the subscription information, the SST of the slice that is allowed to be accessed by the terminal device and the RAT type that is allowed to be used when the terminal device accesses the slice that is allowed to be accessed, so that the AMF device can add the information to the first acceptance message and send the first acceptance message to the terminal device. In this way, the terminal device may request, based on the SST of the slice that is allowed to be accessed by the terminal device and the RAT type that is allowed to be used when the terminal device accesses the slice that is allowed to be accessed, a to-be-accessed slice from the AMF device, thereby improving slice access efficiency and slice access accuracy.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, after the sending, by the AMF device, an acceptance message to the terminal device, the method further includes:

receiving, by the AMF device from the access network node device, a second request message sent by the terminal device, where the second request message is used to indicate an SST of a slice to be accessed by the terminal device and a RAT type used when the terminal device accesses the to-be-accessed slice; and selecting, by the AMF device for the terminal device based on the second request message, an SST of a slice connected to the AMF device, and a RAT type supported by the slice connected to the AMF device, a slice that provides a service.

According to the access method provided in the embodiment, after receiving the second request message that is used to indicate the SST of the slice to be accessed by the terminal device and the RAT type used when the terminal device accesses the to-be-accessed slice, the AMF device may select a correct slice for the terminal device based on the SST of the to-be-accessed slice and the RAT type used for accessing the slice, to improve slice access accuracy.

According to a third aspect, this application provides an access method. The method includes:

sending, by a terminal device, a first request message to an access and mobility management function AMF device by using an access network node device, where the first request message carries identification information of the terminal device; and receiving, by the terminal device by using the access network node device, a first acceptance message sent by the AMF device, where the first acceptance message includes a slice/service type SST of a slice that is allowed to be accessed by the terminal device and a radio access technology RAT type that is allowed to be used when the terminal device accesses the slice that is allowed to be accessed.

According to the access method provided in the third aspect, after sending the first request message to the AMF device, the terminal device may receive the first acceptance message that carries the SST of the slice that is allowed to be accessed by the terminal device and the RAT type that is allowed to be used when the terminal device accesses the slice that is allowed to be accessed, so that the terminal device can request a to-be-accessed slice from the AMF device based on the SST of the slice that is allowed to be accessed by the terminal device and the RAT type that is allowed to be used when the terminal device accesses the slice that is allowed to be accessed, thereby improving slice access efficiency and slice access accuracy.

In one embodiment, the first request message further includes first network slice selection assistance information; and the first network slice selection assistance information is configured network slice selection assistance information or accepted network slice selection assistance information.

According to a fourth aspect, this application provides an access method. The method includes:

receiving, by an access and mobility management function AMF device from an access network node device, a first request message sent by a terminal device, where the first request message carries identification information of the terminal device;

obtaining, by the AMF device, subscription information of the terminal device from a subscription database based on the identification information of the terminal device;

determining, by the AMF device, first information based on the subscription information of the terminal device, where the first information is used to indicate a slice/service type SST of a slice that is allowed to be accessed by the terminal device and a radio access technology RAT type that is allowed to be used when the terminal device accesses the slice that is allowed to be accessed;

determining, by the AMF device based on the first information, an SST of a slice connected to the AMF device, and a RAT type supported by the slice connected to the AMF device, whether the AMF device can provide a service for the terminal device; and if the AMF device cannot provide a service for the terminal device, triggering, by the AMF device, an AMF device reselection operation.

According to the access method provided in the fourth aspect, after receiving the first request message of the terminal device, the AMF device may first obtain the subscription information of the terminal device, to obtain, by using the subscription information, the slice/service type SST of the slice that is allowed to be accessed by the terminal device and the radio access technology RAT type that is allowed to be used when the terminal device accesses the slice that is allowed to be accessed. In this way, when determining based on the information that a service cannot be provided for the terminal device, the AMF device may trigger an AMF device reselection operation for the terminal device, to ensure that the terminal device can access a first AMF device that supports the terminal device in accessing different slices by using a plurality of types of RATs. In this way, a probability of reselecting an AMF for the terminal device can be reduced in a communication process of the terminal device, thereby reducing signaling overheads and improving communication efficiency.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the triggering, by the AMF device, an AMF device reselection operation includes:

reselecting, by the AMF device, an AMF device for the terminal device based on the first information; or sending, by the AMF device, a third request message to a second AMF device, where the third request message is used to instruct the second AMF device to reselect an AMF device for the terminal device; or sending, by the AMF device, a rejection message to the access network node device, where the rejection message is used to instruct the access network node device to reselect an AMF device for the terminal device.

According to the access method provided in the embodiment, an operation of reselecting an AMF device for the terminal device is performed in various flexible manners, so that it can be ensured that the terminal device can be connected to the first AMF device that supports the terminal device in accessing different slices by using a plurality of types of RATs. In this way, a probability of reselecting an AMF for the terminal device can be reduced in the communication process of the terminal device, thereby reducing signaling overheads and improving communication efficiency.

According to a fifth aspect, this application provides a network device. The network device includes:

a first obtaining module, configured to obtain first information, where the first information is used to indicate a slice/service type SST of a slice that is allowed to be accessed by a terminal device and a radio access technology RAT type that is allowed to be used when the terminal device accesses the slice that is allowed to be accessed;

a second obtaining module, configured to obtain second information, where the second information is used to indicate an SST of a slice connected to an access and mobility management function AMF device and a RAT type supported by the slice connected to the AMF device; and a selection module, configured to select, based on the first information and the second information, a first AMF device that serves the terminal device.

In one embodiment, the network device is an access network node device; and the first obtaining module is specifically configured to: obtain first network slice selection assistance information from the terminal device, where the first network slice selection assistance information includes the first information; or obtain second network slice selection assistance information from a second AMF device, where the second network slice selection assistance information includes the first information.

In one embodiment, the first obtaining module is specifically configured to receive a first request message from the terminal device, where the first request message carries the first network slice selection assistance information, and the first network slice selection assistance information is configured network slice selection assistance information or accepted network slice selection assistance information.

In one embodiment, the second network slice selection assistance information is accepted network slice selection assistance information.

In one embodiment, the second obtaining module is specifically configured to: obtain the second information from the AMF device; or obtain the second information from an access network domain management device.

In one embodiment, the network device is a second AMF device; and the first obtaining module is specifically configured to: obtain subscription information of the terminal device from a subscription database, and determine the first information based on the subscription information of the terminal device.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the selection module is specifically configured to: match the first information and the second information, and select, as the first AMF device, an AMF device that supports the SST of the slice that is allowed to be accessed by the terminal device and the RAT type that is allowed to be used when the terminal device accesses the SST of the slice that is allowed to be accessed.

For beneficial effects of the network device provided in the fifth aspect and the embodiments of the fifth aspect, refer to the beneficial effects brought by the first aspect and the embodiments of the first aspect. Details are not described herein again.

According to a sixth aspect, this application provides an access and mobility management function AMF device. The AMF device includes:

a first receiving module, configured to receive, from an access network node device, a first request message sent by a terminal device, where the first request message carries an identifier of the terminal device;

an obtaining module, configured to obtain, from a subscription database based on identification information of the terminal device, subscription information corresponding to the identifier of the terminal device;

a determining module, configured to determine, based on the subscription information, a slice/service type SST of a slice that is allowed to be accessed by the terminal device and a radio access technology RAT type that is allowed to be used when the terminal device accesses the slice that is allowed to be accessed; and a sending module, configured to send a first acceptance message to the terminal device, where the first acceptance message includes the SST of the slice that is allowed to be accessed by the terminal device and the RAT type that is allowed to be used when the terminal device accesses the slice that is allowed to be accessed.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the AMF device further includes:

a second receiving module, configured to: after the sending module sends the acceptance message to the terminal device, receive, from the access network node device, a second request message sent by the terminal device, where the second request message is used to indicate an SST of a slice to be accessed by the terminal device and a RAT type used when the terminal device accesses the to-be-accessed slice; and a selection module, configured to select, for the terminal device based on the second request message, an SST of a slice connected to the AMF device, and a RAT type supported by the slice connected to the AMF device, a slice that provides a service.

For beneficial effects of the AMF device provided in the sixth aspect and the embodiments of the sixth aspect, refer to the beneficial effects brought by the second aspect and the embodiments of the second aspect. Details are not described herein again.

According to a seventh aspect, this application provides a terminal device. The terminal device includes:

a sending module, configured to send a first request message to an access and mobility management function AMF device by using an access network node device, where the first request message carries identification information of the terminal device; and a receiving module, configured to receive, by using the access network node device, a first acceptance message sent by the AMF device, where the first acceptance message includes a slice/service type SST of a slice that is allowed to be accessed by the terminal device and a radio access technology RAT type that is allowed to be used when the terminal device accesses the slice that is allowed to be accessed.

In one embodiment, the first request message further includes first network slice selection assistance information; and the first network slice selection assistance information is configured network slice selection assistance information or accepted network slice selection assistance information.

For beneficial effects of the AMF device provided in the seventh aspect and the embodiments of the seventh aspect, refer to the beneficial effects brought by the third aspect and embodiments of the third aspect. Details are not described herein again.

According to an eighth aspect, this application provides an access and mobility management function AMF device. The AMF device includes:

a receiving module, configured to receive, from an access network node device, a first request message sent by a terminal device, where the first request message carries identification information of the terminal device;

an obtaining module, configured to obtain subscription information of the terminal device from a subscription database based on the identification information of the terminal device;

a first determining module, configured to determine first information based on the subscription information of the terminal device, where the first information is used to indicate a slice/service type SST of a slice that is allowed to be accessed by the terminal device and a radio access technology RAT type that is allowed to be used when the terminal device accesses the slice that is allowed to be accessed;

a second determining module, configured to determine, based on the first information, an SST of a slice connected to the AMF device, and a RAT type supported by the slice connected to the AMF device, whether the AMF device can provide a service for the terminal device; and a triggering module, configured to: when the AMF device cannot provide a service for the terminal device, trigger an AMF device reselection operation.

In one embodiment, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the triggering module is specifically configured to: reselect an AMF device for the terminal device based on the first information; send a third request message to a second AMF device, where the third request message is used to instruct the second AMF device to reselect an AMF device for the terminal device; or send a rejection message to the access network node device, where the rejection message is used to instruct the access network node device to reselect an AMF device for the terminal device.

For beneficial effects of the AMF device provided in the eighth aspect and the embodiments of the eighth aspect, refer to the beneficial effects brought by the fourth aspect and the embodiments of the fourth aspect. Details are not described herein again.

According to a ninth aspect, this application provides a network device, including a processor, a memory, a receiver, and a transmitter. Both the receiver and the transmitter are coupled to the processor. The processor controls a receiving action of the receiver, and the processor controls a sending action of the transmitter.

The memory is configured to store computer executable program code. The program code includes an instruction. When the processor executes the instruction, the network device performs the access method in any one of the first aspect and the possible implementations of the first aspect.

For beneficial effects of the network device provided in the ninth aspect, refer to the beneficial effects in the first aspect and the possible implementations of the first aspect. Details are not described herein again.

According to a tenth aspect, this application provides an access and mobility management function AMF device, including a processor, a memory, a receiver, and a transmitter. The receiver and the transmitter are coupled to the processor. The processor controls a receiving action of the receiver, and controls a sending action of the transmitter.

The memory is configured to store computer executable program code. The program code includes an instruction. When the processor executes the instruction, the AMF device performs the access method in any one of the second aspect and the possible implementations of the second aspect.

For beneficial effects of the AMF device provided in the tenth aspect, refer to the beneficial effects in the second aspect and the possible implementations of the second aspect. Details are not described herein again.

According to an eleventh aspect, this application provides a terminal device, including a processor, a memory, a receiver, and a transmitter. The receiver and the transmitter are coupled to the processor. The processor controls a receiving action of the receiver, and controls a sending action of the transmitter.

The memory is configured to store computer executable program code. The program code includes an instruction. When the processor executes the instruction, the terminal device performs the access method in any one of the third aspect and the possible implementations of the third aspect.

For beneficial effects of the terminal device provided in the eleventh aspect, refer to the beneficial effects in the third aspect and the possible implementations of the third aspect. Details are not described herein again.

According to a twelfth aspect, this application provides an access and mobility management function AMF device, including a processor, a memory, a receiver, and a transmitter. The receiver and the transmitter are coupled to the processor. The processor controls a receiving action of the receiver, and controls a sending action of the transmitter.

The memory is configured to store computer executable program code. The program code includes an instruction. When the processor executes the instruction, the AMF device performs the access method in any one of the fourth aspect and the possible implementations of the fourth aspect.

For beneficial effects of the AMF device provided in the twelfth aspect, refer to the beneficial effects in the fourth aspect and the possible implementations of the fourth aspect. Details are not described herein again.

According to a thirteenth aspect, this application provides a network device, including at least one processing element (or a chip) for performing the method in the first aspect.

According to a fourteenth aspect, this application provides an access and mobility management function AMF device, including at least one processing element (or a chip) for performing the method in the second aspect.

According to a fifteenth aspect, this application provides a terminal device, including at least one processing element (or a chip) for performing the method in the third aspect.

According to a sixteenth aspect, this application provides an access and mobility management function AMF device, including at least one processing element (or a chip) for performing the method in the fourth aspect.

According to a seventeenth aspect, this application provides a program, and the program is used to perform the method in the first aspect when the program is executed by a processor.

According to an eighteenth aspect, this application provides a program, and the program is used to perform the method in the second aspect when the program is executed by a processor.

According to a nineteenth aspect, this application provides a program, and the program is used to perform the method in the third aspect when the program is executed by a processor.

According to a twentieth aspect, this application provides a program, and the program is used to perform the method in the fourth aspect when the program is executed by a processor.

According to a twenty-first aspect, this application provides a program product, for example, a computer readable storage medium, including the program in the seventeenth aspect.

According to a twenty-second aspect, this application provides a program product, for example, a computer readable storage medium, including the program in the eighteenth aspect.

According to a twenty-third aspect, this application provides a program product, for example, a computer readable storage medium, including the program in the nineteenth aspect.

According to a twenty-fourth aspect, this application provides a program product, for example, a computer readable storage medium, including the program in the twentieth aspect.

According to a twenty-fifth aspect, this application provides a computer readable storage medium, where the computer readable storage medium stores an instruction, and when the instruction runs on a computer, the computer performs the method in the first aspect.

According to a twenty-sixth aspect, this application provides a computer readable storage medium, where the computer readable storage medium stores an instruction, and when the instruction runs on a computer, the computer performs the method in the second aspect.

According to a twenty-seventh aspect, this application provides a computer readable storage medium, where the computer readable storage medium stores an instruction, and when the instruction runs on a computer, the computer performs the method in the third aspect.

According to a twenty-eighth aspect, this application provides a computer readable storage medium, where the computer readable storage medium stores an instruction, and when the instruction runs on a computer, the computer performs the method in the fourth aspect.

According to the access method, the network device, the terminal device, and the AMF device provided in this application, when an AMF is selected for the terminal device, not only the SST of the slice that is allowed to be accessed by the terminal device needs to be considered, but also the RAT type that is allowed to be used when the terminal device accesses the slice that is allowed to be accessed needs to be considered, so that a first AMF that is selected for the terminal device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed in a communication process of the terminal device. Therefore, according to the access method, the network device, the terminal device, and the AMF provided in this application, a probability of reselecting an AMF for the terminal device can be reduced, thereby reducing signaling overheads and improving communication efficiency.

BRIEF DESCRIPTION OF DRAWINGS

FIG. 3 is a schematic diagram of a communications system according to this application;

FIG. 4 is a schematic flowchart of an access method according to this application;

DESCRIPTION OF EMBODIMENTS

In this application, "a plurality of" means two or more than two, "and/or" describes an association relationship for describing associated objects and represents that three relationships may exist. For example, A and/or B may represent the following three cases: Only A exists, both A and B exist, and only B exists. The character "/" generally indicates an "or" relationship between the associated objects.

In the following, some terms in this application are described, to help a person skilled in the art have a better understanding.

An AN node device may be a base station, or may be an access point (AP). A base station is also referred to as a radio access network (RAN) device and is a device connecting a terminal to a wireless network. The base station may be a base transceiver station (BTS) in global system for mobile communications (GSM) or code division multiple access (CDMA); or may be a NodeB (NB) in wideband code division multiple access (WCDMA); or may be an evolved NodeB (eNB or eNodeB) in long term evolution (LTE), a relay station or an access point, a gNB in a future 5G network, or the like. This is not limited herein.

A terminal device may be a wireless terminal or a wired terminal. The wireless terminal may be a device that provides a user with voice and/or other service data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal. For example, the wireless terminal may be a portable, pocket-sized, handheld, computer built-in, or in-vehicle mobile apparatus, which exchanges voice and/or data with the radio access network. For example, the wireless terminal may be a device such as a personal communications service (PCS) phone, a cordless telephone set, a session initiation protocol (SIP) phone, a wireless local loop (WLL) station, or a personal digital assistant (PDA). The wireless terminal may also be referred to as a system, a subscriber unit, a subscriber station, a mobile station, a mobile console, a remote station, a remote terminal, an access terminal, a user terminal, a user agent, a user device (or User Equipment). This is not limited herein. The terminal device may also be a vehicle in vehicle-to-vehicle (V2V) communication, a machine in machine type communication, or the like.

Figure 1:
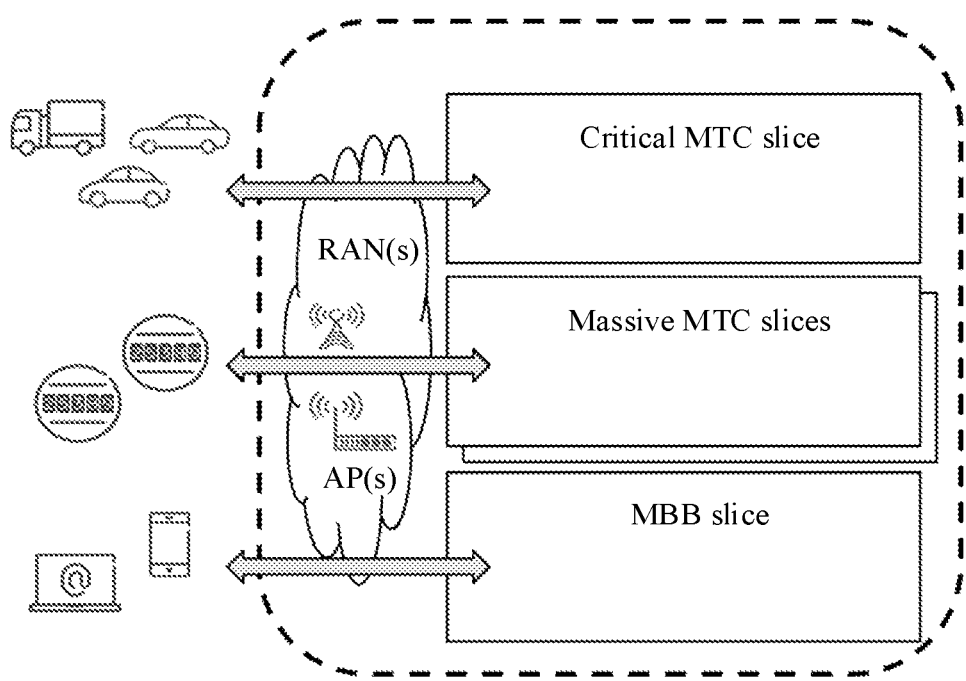
FIG. 1 is a schematic diagram of a core network slice.

FIG. 1 is a schematic diagram of a core network slice. As shown in FIG. 1, a plurality of virtual networks may be obtained through slicing on a same set of broadband network hardware infrastructure in a core network by using a network slicing technology. Each virtual network is considered as a core network slice (briefly referred to as a slice), and each slice supports transmitting data of a service by using one or more radio access technologies (RAT). In this way, a terminal device may select a proper slice for access based on a service requirement of the terminal device, to transmit a service.

The slice described above may be, for example, a critical machine type communication slice (Critical MTC Slice), a massive machine type communication slice (Massive MTC Slice), a mobile broadband slice (MBB Slice), an ultra-reliable and low latency communications slice (URLLC Slice), a multimedia broadcast multicast service slice (MBMS Slice). FIG. 1 is a schematic diagram of an example in which one critical MTC slice, two massive MTC slices, and one MBB slice are obtained through slicing on same broadband network hardware infrastructure.

The RAT described above may be, for example, a wireless local area network (WLAN), a universal mobile telecommunications system (UMTS) terrestrial radio access network (UTRAN), a global system for mobile communications (GSM)/enhanced data rates for GSM evolution (EDGE) radio access network (GERAN), or an evolved universal terrestrial radio access network (E-UTRAN). When the RAT is a 3GPP access technology (for example, the UMTS, UTRAN, and GSM described above), an AN node device corresponding to the RAT may be a RAN. To be specific, when the terminal device needs to transmit a service by using the 3GPP access technology, the terminal device may access, by using the RAN, a slice that supports the 3GPP access technology. When the RAT is the WLAN, an AN node device corresponding to the RAT may be an AP. To be specific, when the terminal device needs to transmit a service by using the WLAN, the terminal device may access, by using the AP, a slice that supports the WLAN. FIG. 1 is a schematic diagram of a core network slice in which a RAN and an AP are used as an example.

There are a plurality of AMF devices in a network. Each AMF device may be connected to a plurality of slices, and the AMFs may be connected to different slices. The AMF device is configured to connect a terminal device that accesses the AMF device, to a slice that needs to be accessed by the terminal device. Currently, a scenario in which a terminal device can simultaneously access a plurality of slices is proposed. The plurality of slices may share one or more core network devices, for example, an AMF device. In this architecture, when the terminal device initially accesses an AN node device, the AN node device may select, based on NSSAI of the terminal device, a to-be-accessed AMF device for the terminal device. The NSSAI may include a SST of at least one slice that is allowed to be accessed by the terminal device and supplementary information used to distinguish between slices with a same SST, for example, tenant identification (Tenant ID) and an identifier of a group to which the terminal device belongs. However, when the AN node device determines a to-be-accessed AMF device for the terminal device in the foregoing manner, only an SST supported by the terminal device is considered, and a RAT used when the terminal device accesses a slice is not considered. Therefore, the following cases may exist.

Figure 2:
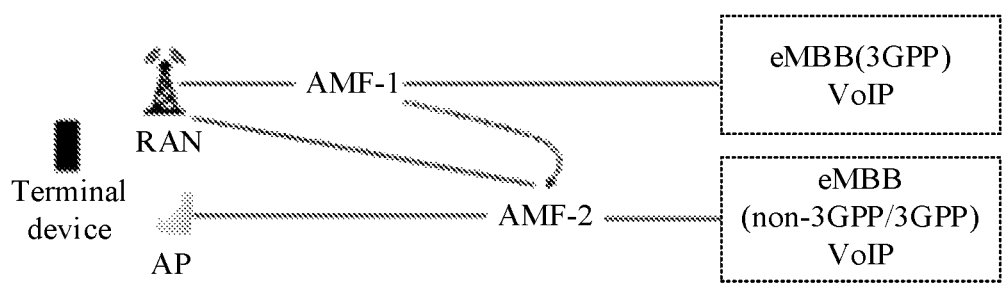
FIG. 2 is a schematic diagram of a scenario in which a terminal device accesses a core network slice.

FIG. 2 is a schematic diagram of a scenario in which a terminal device accesses a core network slice. As shown in FIG. 2, it is assumed that a terminal device supports a voice service and an Internet access service, and the terminal device supports 3GPP and WLAN radio access technologies. A slice corresponding to the voice service is a voice over internet protocol slice (VoIP Slice), and a slice corresponding to the Internet access service is an enhanced mobile broadband slice (eMBB Slice). In other words, slices that are allowed to be accessed by the terminal device include the VoIP slice and the eMBB slice. In this case, an SST included in NSSAI of the terminal device is VoIP and eMBB.

In an example in which the terminal device initially uses 3GPP to perform a voice service, after the terminal device accesses a RAN by using the 3GPP access technology, the RAN does not consider a RAT that may be used when the terminal device accesses another slice. Therefore, based on the NSSAI of the terminal device, the RAN selects, for the terminal device, an AMF device that is connected to the VoIP slice that supports the 3GPP access technology and the eMBB slice that supports the 3GPP, and makes the terminal device connect to the AMF device. However, the AMF device is not connected to an eMBB slice that supports another radio access technology. In this example, it is assumed that the currently selected AMF device is an AMF-1 device. In this case, the terminal device performs a voice service by using the VoIP slice connected to the AMF-1 device.

It is assumed that the AMF-1 device is not connected to an eMBB slice that supports the WLAN. If the terminal device needs to perform the Internet access service by using the WLAN while the terminal device performs the voice service, after the terminal device accesses an AP by using the WLAN, the AMF-1 device cannot connect the terminal device to a proper eMBB slice because the AMF-1 device is not connected to the eMBB slice that supports the WLAN. In this case, in order that the terminal device can access, by using a same AMF device, a plurality of slices supported by the terminal device, it is necessary to reselect, for the terminal device, an AMF device that can be simultaneously connected to the VoIP slice that supports the 3GPP access technology and the eMBB slice that supports the WLAN, and reconnect the terminal device to the reselected AMF. In this example, the reselected AMF device is an AMF-2 device. In this way, the terminal device can access, by using the 3GPP access technology and the AMF-2 device, the VoIP slice that supports the 3GPP access technology, and access, by using the WLAN and the AMF-2 device, the eMBB slice that supports the WLAN, so that a plurality of slices can share a same AMF device.

It may be learned from the foregoing descriptions that, when an AN node device that is initially accessed by the terminal device determines a to-be-accessed AMF device for the terminal device in the foregoing manner, only an SST of a slice that is allowed to be accessed by the terminal device is considered, and a RAT that is used when the terminal device accesses the slice is not considered. Therefore, when the terminal device accesses a plurality of slices by using different RATs, the AMF reselection case shown in the foregoing example occurs. In this AMF reselection method, although the terminal device may simultaneously access a plurality of slices by using a same AMF, performing AMF reselection in a communication process of the terminal device causes relatively large signaling overheads and relatively low communication efficiency.

In view of the foregoing case, this application provides an access method. In this method, when a network device selects an AMF device for the terminal device, not only the SST of the slice that is allowed to be accessed by the terminal device is considered, but also the RAT that is used when the terminal device accesses the slice that is allowed to be accessed is considered, so that the AMF selected by the network device for the terminal device can support the terminal device in accessing different slices by using a plurality of RATs. In this way, a probability of reselecting an AMF is reduced in a communication process of the terminal device, thereby reducing signaling overheads and improving communication efficiency. Therefore, the access method provided in this application aims to resolve a prior-art technical problem in the following: An AN node device selects an AMF device for the terminal device only by using NSSAI of the terminal device, and an AMF device needs to be reselected in a communication process of the terminal device, causing relatively high signaling overheads and relatively low communication efficiency.

FIG. 3 is a schematic diagram of a communications system according to this application. As shown in FIG. 3, the communications system includes a terminal device, an AN node device, a default AMF device, at least one AMF device, and a subscription database. FIG. 3 shows an example in which a communications system includes one AMF device. However, a person skilled in the art may understand that the communications system may include a plurality of AMF devices. For a manner of connecting each AMF device to another device in the communications system, refer to FIG. 3. Details are not described herein.

The AN node device is configured to connect the terminal device to the AMF device. The AN node device in this application is an AN node device that is accessed by the terminal device currently by using a RAT. For example, if the terminal device currently uses a WLAN, the AN node device accessed by the terminal device may be an AP. If the terminal device currently uses the 3GPP, the AN node device accessed by the terminal device may be a RAN.

The default AMF device is configured to select a to-be-accessed AMF device for the terminal device after the default AMF device receives a request message of the terminal device that is forwarded by the AN node device or another AMF device.

Each of the plurality of AMF devices may be connected to a plurality of slices, and the plurality of AMFs are configured to select a specific slice for the terminal device based on a service requirement of the terminal device connected to the plurality of AMF devices. Each slice connected to the AMF device has a session management function (SMF), a user plane function (UPF), and the like. The slice described herein is used to process and transmit a service corresponding to the slice.

The subscription database stores subscription information of the terminal device, and is used to provide the subscription information of the terminal device for the default AMF device and the plurality of AMF devices.

It should be noted that the communications system may be an LTE communications system, or may be another future communications system. This is not limited herein.

The communications system is used as an example below, and the technical solutions of this application are described in detail by using some embodiments. The following several embodiments may be combined with each other, and a same or similar concept or process may not be described repeatedly in some embodiments.

FIG. 4 is a schematic flowchart of an access method according to this application. This embodiment relates to a process in which a network device selects an AMF for a terminal device based on an SST of a slice that is allowed to be accessed by the terminal device and a RAT type that is allowed to be used when the terminal device accesses the slice that is allowed to be accessed. The network device described herein may be any device that is on a network side and that has a function of selecting an AMF device for the terminal device, for example, an AN node device or an AMF device (for example, a default AMF device or any AMF of the plurality of AMF devices). The network device may be specifically determined based on configuration on the network side and a function division of a network side device. As shown in FIG. 4, the method may include the following operations.

In operation S101, the network device obtains first information, where the first information is used to indicate the SST of the slice that is allowed to be accessed by the terminal device and the RAT type that is allowed to be used when the terminal device accesses the slice that is allowed to be accessed.

For example, when the terminal device initially accesses a network, the network device may obtain the first information, and may further obtain, by using the first information, the SST of the slice that is allowed to be accessed by the terminal device and the RAT type that is allowed to be used when the terminal device accesses the slice that is allowed to be accessed.

When the network device is an AN node device, the AN node device may obtain the first information stored in the AN node device. Alternatively, the AN node device may obtain the first information by receiving the first information sent by the terminal device to the AN node device. For example, the AN node device may obtain first NSSAI from the terminal device, to obtain the first information carried in the first NSSAI. Alternatively, the AN node device may obtain the first information from an AMF device (briefly referred to as a second AMF device) that has the first information. For example, the AN node device may obtain second NSSAI from the second AMF device, to obtain the first information carried in the second NSSAI.

When the network device is an AMF device, the AMF device may determine the first information and the like based on information obtained from a subscription database. Alternatively, the AMF device may obtain the first information by receiving the first information sent by the terminal device to the AMF device. For example, the AMF device may obtain the first NSSAI from the terminal device, to obtain the first information carried in the first NSSAI. Alternatively, the AMF device may obtain the first information from another AMF device that has the first information. The AMF device may further obtain second NSSAI from another AMF device, to obtain the first information carried in the second NSSAI.

How the first information indicates the SST of the slice that is allowed to be accessed by the terminal device and the RAT type that is allowed to be used when the terminal device accesses the slice that is allowed to be accessed is not limited in this embodiment. For example, the first information may perform indication in a manner of carrying an identifier of the SST of the slice that is allowed to be accessed by the terminal device and an identifier of the RAT type that is allowed to be used when the terminal device accesses the slice that is allowed to be accessed. A classification manner in the prior art may be applied to the SST and the RAT type. For example, the RAT type may be any one of the following: a UTRAN, a GERAN, an EUTRAN, a global area network (GAN), high speed packet access evolution (HSPA Evolution), an untrusted WLAN, a trusted WLAN, and the like. The SST may be any one of the following: enhanced mobile broadband (eMBB), ultra-reliable and low latency communications (URLLC), massive internet of things (mIoT), critical communications, and the like.

In operation S102, the network device obtains second information, where the second information is used to indicate an SST of a slice connected to an AMF device and a RAT type supported by the connected slice.

For example, the network device may further obtain the second information, to obtain, based on the second information, an SST of a slice connected to an AMF device that is on a core network side and that can be connected to the network device and a RAT type supported by the slice connected to the AMF device to which the network device can be connected. In one embodiment, the network device may obtain the second information stored in the network device. Alternatively, the network device may obtain, from each AMF device to which the network device can be connected, an SST used to indicate a slice to which the AMF device is connected, and indication information of a RAT type supported by the slice to which the AMF device is connected. In this case, the indication information obtained by the network device from the AMF device to which the network device can be connected is the second information. Alternatively, the network device may obtain the second information from an access network domain manager (AN Domain Management) device configured to manage an access network device in an access network domain.

How the second information indicates the SST of the slice connected to the AMF device and the RAT type supported by the connected slice is not limited in this embodiment. For example, the second information may perform indication in a manner of carrying an identifier of an AMF device, an SST of a slice connected to the AMF device, and a RAT type supported by the connected slice.

In operation S103, the network device selects, for the terminal device based on the first information and the second information, a first AMF device that serves the terminal device.

For example, after the network device learns of, by using the first information, the SST of the slice that is allowed to be accessed by the terminal device and the RAT type that is allowed to be used when the terminal device accesses the slice that is allowed to be accessed, and learns of, by using the second information, an SST of a slice connected to each AMF device to which the network device can be connected and a RAT type supported by the slice connected to each AMF device, the network device may select, for the terminal device based on the information, the first AMF device that serves the terminal device, so that the terminal device can access different slices by using a plurality of types of RATs and the first AMF device. In one embodiment, the network device may select, as the first AMF device in a manner of matching the first information and the second information, an AMF device that supports the SST of the slice that is allowed to be accessed by the terminal device and the RAT type that is allowed to be used when the terminal device accesses the SST of the slice that is allowed to be accessed.

According to the access method provided in this application, when the network device selects an AMF for the terminal device, not only the SST of the slice that is allowed to be accessed by the terminal device needs to be considered, but also the RAT type that is allowed to be used when the terminal device accesses the slice that is allowed to be accessed needs to be considered, so that the first AMF that is selected by the network device for the terminal device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed in a communication process of the terminal device. Therefore, according to the method in this application, a probability of reselecting an AMF for the terminal device can be reduced, thereby reducing signaling overheads and improving communication efficiency.

Figure 5:
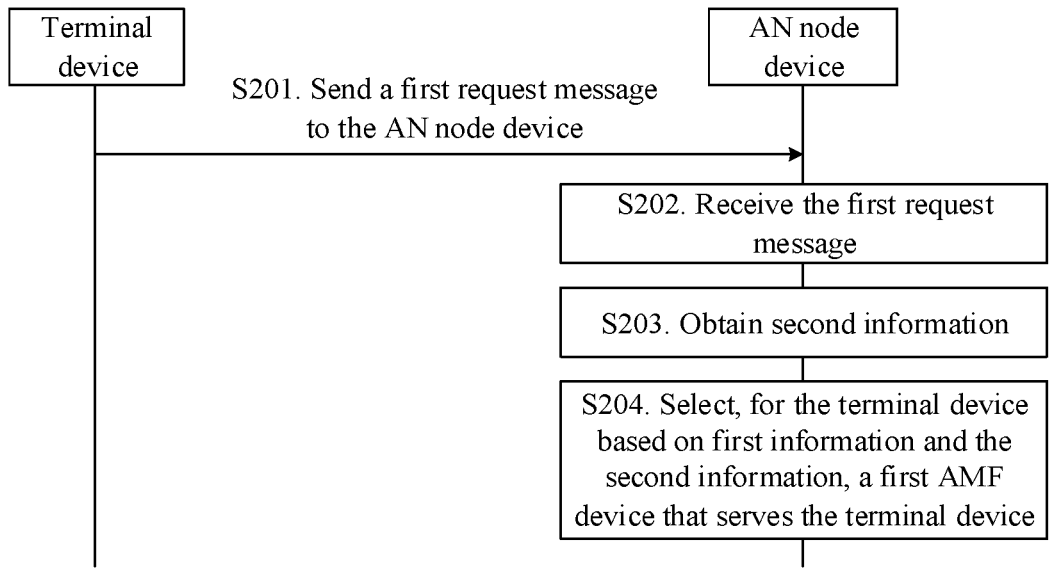
FIG. 5 is a schematic flowchart of another access method according to this application.

FIG. 5 is a schematic flowchart of another access method according to this application. As described above, when the foregoing network device is an AN node device, the AN node device may obtain first NSSAI from a terminal device, to obtain first information carried in the first NSSAI. In specific implementation, the AN node device may obtain the first NSSAI by receiving the first NSSAI sent by the terminal device. For example, the AN node device may obtain the first NSSAI by receiving a request message that carries the first NSSAI and that is sent by the terminal device. This embodiment relates to a process in which the AN node device obtains, based on the first NSSAI carried in a first request message sent by the terminal device, an SST of a slice that is allowed to be accessed by the terminal device and a RAT type that is allowed to be used when the terminal device accesses the slice that is allowed to be accessed, and selects an AMF device for the terminal device. The first NSSAI includes the first information. As shown in FIG. 5, the method may include the following operations.

In operation S201, the terminal device sends the first request message to the AN node device.

The first request message includes an identifier of the terminal device, the first NSSAI, and the like. The first NSSAI is configured NSSAI or accepted/allowed NSSAI.

For example, in this embodiment, when the terminal device initially accesses a network, the terminal device may send the first request message to the AN node device. The first request message may include the identifier of the terminal device, the first NSSAI, and the like. The identifier of the terminal device may be any identifier that can be used to uniquely identify the terminal device, for example, an international mobile subscriber identity (IMSI) of the terminal device. The first NSSAI includes the first information used to indicate the SST of the slice that is allowed to be accessed by the terminal device and the RAT type that is allowed to be used when the terminal device accesses the slice that is allowed to be accessed. Content included in the first information in the first NSSAI is not limited in this embodiment. For example, the first information may include content shown in Table 1 below.

TABLE 1

First information included in first NSSAI

| Number | SST of a slice that is allowed to be accessed by a terminal device | RAT type that is allowed to be used when the terminal device accesses the slice that is allowed to be accessed |
| --- | --- | --- |
| 1 | Slice type 1 | RAT type 1 and RAT type 3 |
| 2 | Slice type 2 | RAT type 2 |
| 3 | Slice type 3 | RAT type 4 |

Each RAT type in the RAT types shown in Table 1 may be an identifier of each RAT type, or may be a preset value corresponding to each RAT type. A relationship between the RAT type and the preset value may be, for example, shown in Table 2 below.

TABLE 2

| RAT type | Value |
| --- | --- |
| <reserved> | 0 |
| UTRAN | 1 |
| GERAN | 2 |
| EUTRAN | 3 |
| GAN | 4 |
| HSPA Evolution | 5 |
| Untrusted WLAN | 6 |
| Trusted WLAN | 7 |

It should be noted that Table 1 and Table 2 are merely examples. The first information in this application is not limited to content in Table 1 and Table 2. All first information that can indicate the SST of the slice that is allowed to be accessed by the terminal device and the RAT type that is allowed to be used when the terminal device accesses the slice that is allowed to be accessed is within a protection scope of this application.

In one embodiment, the first NSSAI carried in the first request message may be configured NSSAI or may be accepted/allowed NSSAI, and may be specifically determined based on NSSAI stored in the terminal device. The configured NSSAI described herein may be default NSSAI configured on the terminal device. The accepted/allowed NSSAI may be subscription NSSAI of the terminal device or accepted/allowed NSSAI determined on a network side based on subscription NSSAI of the terminal device and a capability of the network side.

In one embodiment, the first request message may be a registration request message sent when the terminal device executes a registration procedure, an attach request message sent when the terminal device executes an attach access procedure, a location area update request message sent when the terminal device executes a location area update procedure, or the like.

In operation S202, the AN node device receives the first request message.

In operation S203, the AN node device obtains second information.

The second information is used to indicate an SST of a slice connected to an access and mobility management function AMF device and a RAT type supported by the connected slice.

For example, for related descriptions of this operation, refer to the descriptions of operation S102. Details are not described again.

In operation S204, the AN node device selects, for the terminal device based on the first information and the second information, a first AMF device that serves the terminal device.

For example, for related descriptions of this operation, refer to the descriptions of operation S103. Details are not described again.

In this case, the AN node device completes a process of selecting, for the terminal device based on the first NSSAI carried in the first request message sent by the terminal device, the first AMF device that serves the terminal device.

According to the access method provided in this application, after receiving the first request message of the terminal device, the AN node device may select a to-be-accessed first AMF for the terminal device based on the first information included in the first NSSAI carried in the first request message. When the AN node device selects the first AMF device for the terminal device, not only the SST of the slice that is allowed to be accessed by the terminal device is considered, but also the RAT type that is allowed to be used when the terminal device accesses the slice that is allowed to be accessed is considered. Therefore, it is ensured that the selected first AMF device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed in a communication process of the terminal device. Therefore, according to the method in this application, a probability of reselecting an AMF for the terminal device can be reduced, thereby reducing signaling overheads and improving communication efficiency.

Figure 6:
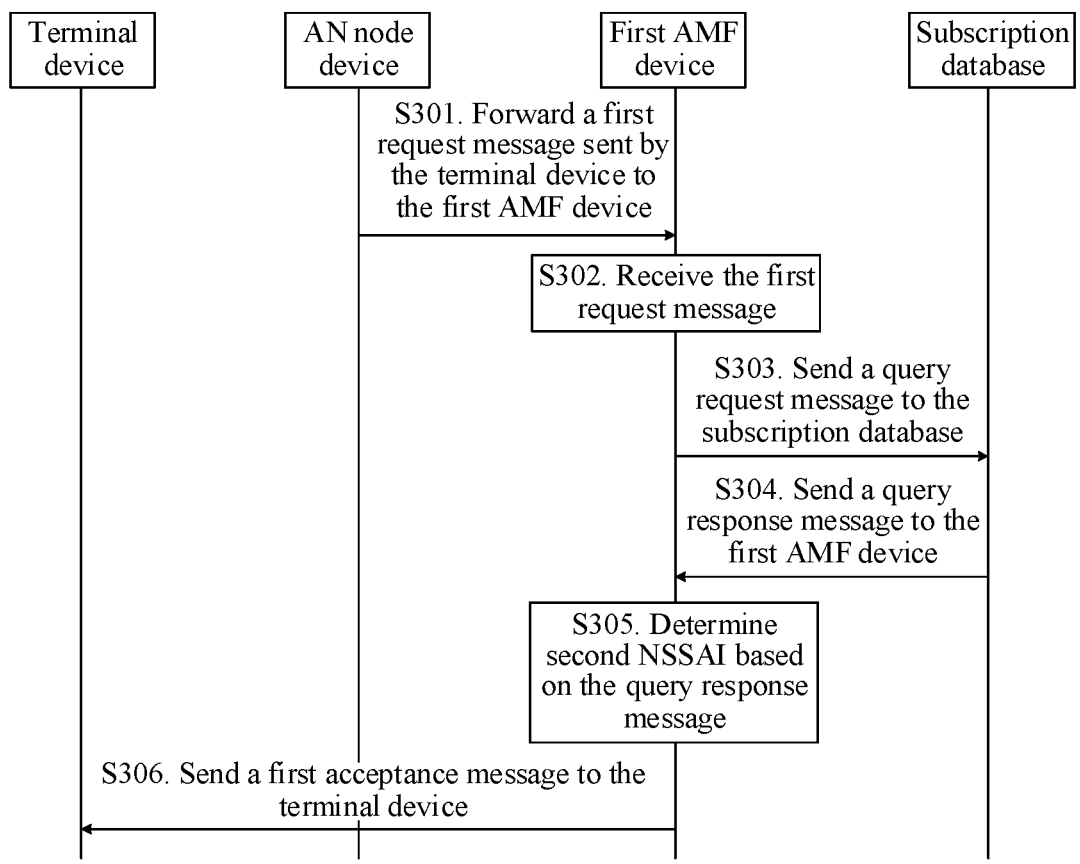
FIG. 6 is a schematic flowchart of still another access method according to this application.

FIG. 6 is a schematic flowchart of still another access method according to this application. This embodiment relates to a process in which an AN node device connects a terminal device to a first AMF device. As shown in FIG. 6, after S204, the method may further include the following operations.

In operation S301, the AN node device forwards a first request message sent by the terminal device to the first AMF device.

The first request message includes an identifier of the terminal device, first NSSAI, and the like. The first NSSAI is configured NSSAI or accepted/allowed NSSAI.

In operation S302, the first AMF device receives the first request message.

In operation S303, the first AMF device sends a query request message to a subscription database.

The query request message includes the identifier of the terminal device.

In the prior art, after the AMF device receives the first request message forwarded by the AN node device, the AMF device needs to authenticate the terminal device based on subscription information of the terminal device, to determine whether the terminal device is allowed to access a network. Therefore, after the first AMF device receives the first request message forwarded by the AN node device, the first AMF device may obtain, based on the identifier of the terminal device carried in the first request message, the subscription information of the terminal device from the subscription database that stores subscription information of each terminal device.

The subscription information of each terminal device stored in the subscription database of this application further includes third NSSAI of each terminal device. This is different from the prior art. The third NSSAI may include an SST of a slice to which the terminal device subscribes and a RAT type that is allowed to be used when the terminal device accesses the subscribed slice. In other words, the third NSSAI may be NSSAI to which the terminal device subscribes. Alternatively, the third NSSAI may include an SST of a slice that is allowed to be accessed by the terminal device and a RAT type that is allowed to be used when the terminal device accesses the slice that is allowed to be accessed. In other words, the third NSSAI may be allowed/accepted NSSAI of the terminal device.

Therefore, after receiving the first request message sent by the AN node, the first AMF device may send, to the subscription database based on the identifier of the terminal device carried in the first request message, the query request message that carries the identifier of the terminal device, to obtain the subscription information of the terminal device. The subscription information includes the third NSSAI of the terminal device.

In operation S304, the subscription database sends a query response message to the first AMF device.

The query response message includes the subscription information of the terminal device.

For example, after receiving the query request message, the subscription database may search the database for subscription information that carries the third NSSAI and that corresponds to the identifier of the terminal device, add the subscription information to the query response message, and send the query response message to the first AMF device.

In operation S305, the first AMF device determines second NSSAI based on the query response message.

For example, if the third NSSAI is subscription NSSAI of the terminal device, after receiving the query response message that is sent by the subscription database and that carries the subscription information, the first AMF device may determine, based on the third NSSAI (namely, the subscription NSSAI of the terminal device) carried in the subscription information and a network side capability, the allowed/accepted NSSAI of the terminal device, namely, the second NSSAI. If the third NSSAI is the allowed/accepted NSSAI of the terminal device, after receiving the query response message that carries the subscription information and that is sent by the subscription database, the first AMF device may use the third NSSAI carried in the subscription information as the second NSSAI. The second NSSAI may include the SST of the slice that is allowed to be accessed by the terminal device and the RAT type that is allowed to be used when the terminal device accesses the slice that is allowed to be accessed.

For a manner in which the first AMF device determines the allowed/accepted NSSAI of the terminal device based on the subscription NSSAI of the terminal device and the network side capability, refer to the prior art. Details are not described herein.

A person skilled in the art may understand that S303 to S305 are merely an example of determining the first information based on information obtained from the subscription database, and a manner of obtaining the first information in this application is not limited thereto.

In operation S306, the first AMF device sends a first acceptance message to the terminal device.

The acceptance message includes the SST of the slice that is allowed to be accessed by the terminal device and the RAT type that is allowed to be used when the terminal device accesses the slice that is allowed to be accessed.

For example, after receiving the query response message, the first AMF device may obtain accurate first information based on the second NSSAI, and may further add the first information to the first acceptance message and send the first acceptance message to the terminal device by using the AN node device. The first acceptance message may carry the first information, a temporary identifier allocated by the first AMF device to the terminal device, and the like. In this way, after receiving the first acceptance message, the terminal device may store the information, to carry some or all of the information in a subsequent signaling interaction process.

In one embodiment, after receiving the query response message, the first AMF device may further determine, based on the accurate first information obtained based on the second NSSAI, an SST of a slice connected to the first AMF device, and a RAT type supported by the slice connected to the first AMF device, whether the first AMF device can provide a service for the terminal device. To be specific, the first AMF device determines whether the first AMF device supports the SST of the slice that is allowed to be accessed by the terminal device and the RAT type that is allowed to be used when the terminal device accesses the SST of the slice that is allowed to be accessed. When determining that the first AMF device can provide a service for the terminal device, the first AMF device sends the first acceptance message to the terminal device. In this way, it may be further ensured that the first AMF device selected for the terminal device is correct. In this way, a case of reselecting an AMF device is reduced in a communication process of the terminal device. The SST of the slice connected to the first AMF device and the RAT type supported by the slice connected to the first AMF device may be preset on the first AMF device, may be obtained by the first AMF device from an access network domain management device, or the like.

In this case, a process of connecting the terminal device to the first AMF device is completed.

According to the access method provided in this application, after selecting the first AMF device for the terminal device, the AN node device may connect the terminal device to the first AMF device, so that the terminal device can access different slices by using a plurality of types of RATs and the first AMF device. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed. Therefore, according to the method in this application, a probability of reselecting an AMF for the terminal device can be reduced in a communication process of the terminal device, thereby reducing signaling overheads and improving communication efficiency.

Figure 7:
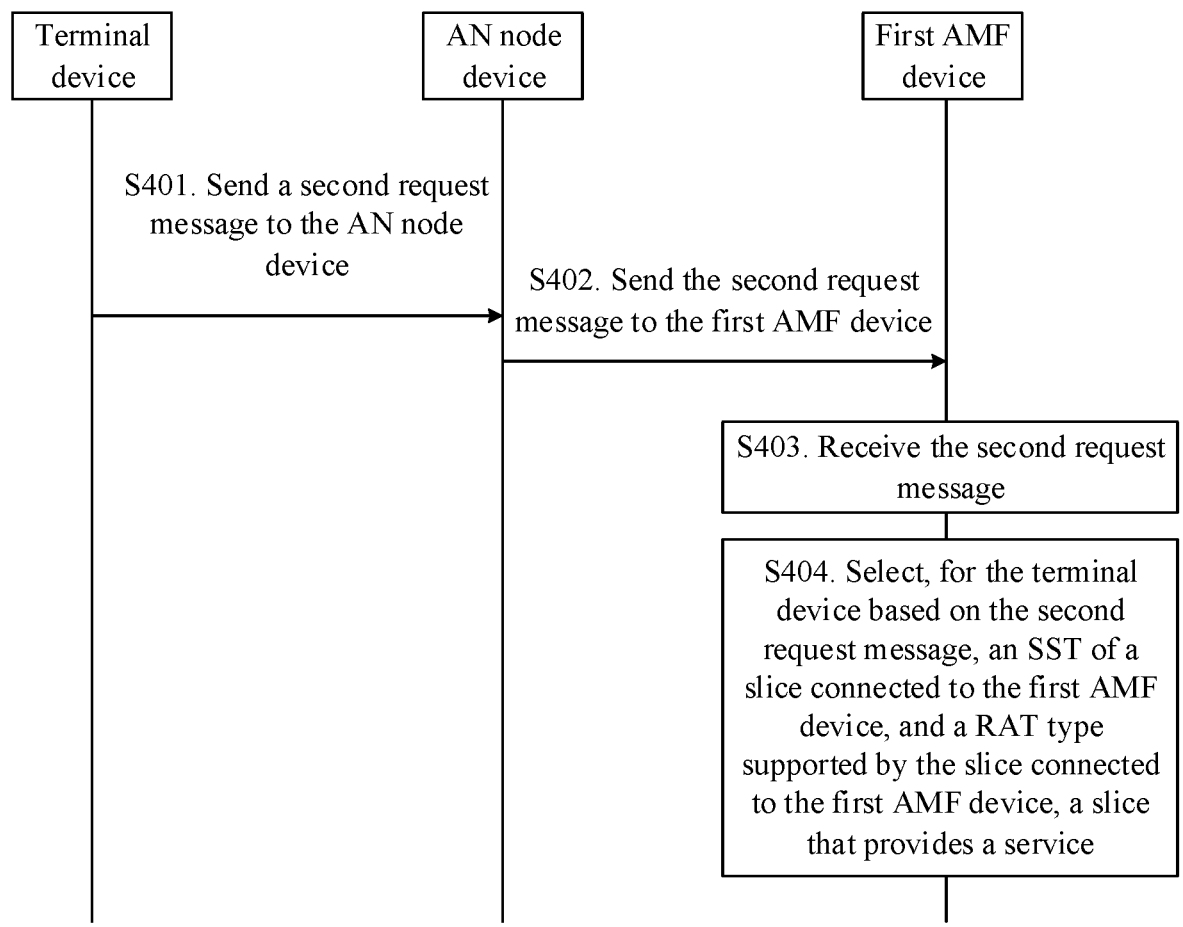
FIG. 7 is a schematic flowchart of still another access method according to this application.

FIG. 7 is a schematic flowchart of still another access method according to this application. As shown in FIG. 7, this embodiment relates to a process in which the foregoing terminal device accesses a slice by using a first AMF device after the terminal device accesses the first AMF device. After S305, the method may further include the following operations.

In operation S401, the terminal device sends a second request message to an AN node device.

The second request message is used to indicate an SST of a slice to be accessed by the terminal device and a RAT type used when the terminal device accesses the to-be-accessed slice. In one embodiment, the second request message may be a session request message, and the like. The slice to be accessed by the terminal device is any one of slices that are allowed to be accessed by the terminal device.

For example, when the terminal device determines, based on a service requirement of the terminal device, that a slice of the slices that are allowed to be accessed by the terminal device needs to be accessed, the terminal device may send the second request message to the AN node. A manner in which the second request message indicates the SST of the slice to be accessed by the terminal device and the RAT type used when the terminal device accesses the to-be-accessed slice is not limited in this embodiment. For example, the second request message may include the SST of the slice to be accessed by the terminal device and the RAT type used when the terminal device accesses the to-be-accessed slice.

In operation S402 the AN node device sends the second request message to the first AMF device.

For example, in the foregoing embodiment, when the AN node device forwards a first acceptance message of the first AMF device to the terminal device, the AN node device may record a mapping relationship between the terminal device and the first AMF device. Therefore, after receiving the second request message, the AN node device may forward the second request message to the first AMF device. For a specific implementation, refer to the prior art. Details are not described.

In operation S403, the first AMF device receives the second request message.

In operation S404, the first AMF device selects, for the terminal device based on the second request message, an SST of a slice connected to the first AMF device, and a RAT type supported by the slice connected to the first AMF device, a slice that provides a service.

For example, after receiving the second request message forwarded by the AN device, the first AMF device may select, based on the SST of the slice to be accessed by the terminal device and the RAT type used when the terminal device accesses the to-be-accessed slice that are indicated by the second request message, the SST of the slice connected to the first AMF device, and the RAT type supported by the slice connected to the first AMF device, a slice that is in slices connected to the first AMF device and that has an SST the same as an SST of the slice to be accessed by the terminal device and a RAT type the same as a RAT type supported by the slice, to provide a service for the terminal device.

In one embodiment, after selecting a slice that provides a service for the terminal device, the first AMF device may send the second request message to the slice that provides a service for the terminal device. In this way, the slice that provides a service for the terminal device may establish a session for the terminal device based on the second request message, and return a second response message to the terminal device by using the first AMF device. After receiving the second response message, the terminal device determines that after accessing the slice, the terminal device may transmit, by using the slice, a service corresponding to the slice. The second response message may be, for example, a session response message. The session response message may include an internet protocol (IP) address of the terminal device, an SST of a slice that is allowed to be accessed by the terminal device, a RAT type that is used when the terminal device accesses the slice that is allowed to be accessed, and the like. The SST of the slice that is allowed to be accessed by the terminal device and the RAT type that is used when the terminal device accesses the slice that is allowed to be accessed may be the SST of the slice to be accessed by the terminal device and the RAT type that is used when the terminal device accesses the to-be-accessed slice that are indicated in the second request message. It should be noted that, for a process in which the slice that provides a service for the terminal device establishes a session for the terminal device based on the second request message and returns the second response message to the terminal device by using the first AMF device, refer to the prior art. Details are not described.

In this case, a process of selecting, for the terminal device, a slice that provides a service is completed.

According to the access method provided in this application, after the AN node device connects the terminal device to the first AMF device, the terminal device may send, to the first AMF device, the second request message used to indicate the SST of the slice to be accessed by the terminal device and the RAT type used when the terminal device accesses the to-be-accessed slice, so that the first AMF device can select a correct slice for the terminal device based on the SST of the to-be-accessed slice and the RAT type used to access the slice, thereby improving slice access accuracy.

Figure 8:
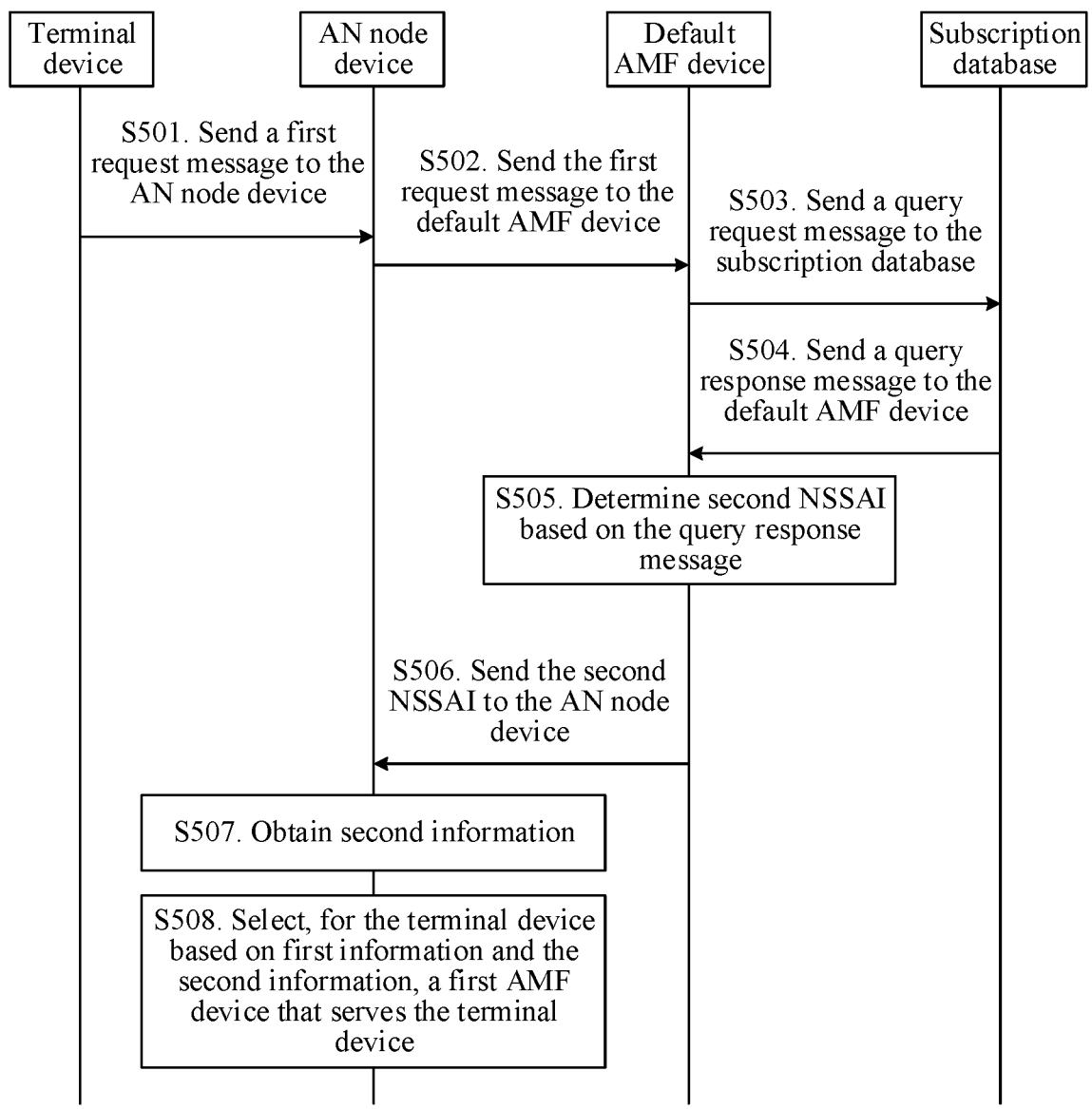
FIG. 8 is a schematic flowchart of still another access method according to this application.

FIG. 8 is a schematic flowchart of still another access method according to this application. As described in the foregoing embodiment, when the foregoing network device is an AN node device, the AN node device may obtain second NSSAI from a second AMF device, to obtain first information carried in the second NSSAI. In this embodiment, an example in which the second AMF device is a default AMF device is used. This embodiment relates to the following process: When the AN node device receives a first request message that is sent by a terminal device and that does not carry first NSSAI including the first information, the AN node device obtains the second NSSAI from the default AMF device, to obtain an SST of a slice that is allowed to be accessed by the terminal device and a RAT type that is allowed to be used when the terminal device accesses the slice that is allowed to be accessed, and select an AMF device for the terminal device. As shown in FIG. 8, the method may include the following operations.

In operation S501, the terminal device sends the first request message to the AN node device.

The first request message includes an identifier of the terminal device.

For example, when the terminal device initially accesses a network, the terminal device may send the first request message to the AN node device. The first request message may include the identifier of the terminal device, and the like. The identifier of the terminal device may be any identifier that can be used to uniquely identify the terminal device, for example, an IMSI of the terminal device.

In one embodiment, the first request message may be a registration request message sent when the terminal device executes a registration procedure, an attach request message sent when the terminal device executes an attach access procedure, a tracking area update request message sent when the terminal device executes a tracking area update procedure, or the like.

In operation S502, the AN node device sends the first request message to the default AMF device.

For example, because the first request message sent by the terminal device to the AN node device does not carry the first NSSAI including the first information, the AN node device may send the first request message to the default AMF device, to obtain the first information by using the default AMF device.

In operation S503, the default AMF device sends a query request message to a subscription database.

The query request message includes the identifier of the terminal device.

For example, after receiving the first request message sent by the AN node device, the default AMF device may send, to the subscription database based on the identifier of the terminal device carried in the first request message, the query request message that carries the identifier of the terminal device.

For descriptions of the subscription database, refer to operation S303. Details are not described again.

In operation S504, the subscription database sends a query response message to the default AMF device.

The query response message includes subscription information of the terminal device.

In operation S505, the default AMF device determines the second NSSAI based on the query response message.

For descriptions of operations S504 and S505, refer to operations S304 and S305. Details are not described herein again.

In operation S506, the default AMF device sends the second NSSAI to the AN node device.

In operation S507, the AN node device obtains second information.

The second information is used to indicate an SST of a slice connected to an access and mobility management function AMF device and a RAT type supported by the connected slice.

For example, for related descriptions of this operation, refer to the descriptions of operation S102. Details are not described again.

In operation S508, the AN node device selects, for the terminal device based on the first information and the second information, a first AMF device that serves the terminal device.

For example, for related descriptions of this operation, refer to the descriptions of operation S103. Details are not described again.

In this case, the AN node device completes a process of selecting, for the terminal device based on the second NSSAI obtained from the second AMF device, the first AMF device that serves the terminal device.

It may be understood by a person skilled in the art that, if another device on a network side in a communications system may also receive the first request message sent by the AN node device and return the first information to the AN node device based on the first request message, the another device may also replace the default AMF device to execute the procedure shown in FIG. 8. Details are not described again.

It should be noted that the method in this embodiment is not only applicable to a scenario in which the first request message sent by the terminal device does not carry the first NSSAI including the first information, but also applicable to a scenario in which the first request message carries the first NSSAI, but the first NSSAI includes only information that is used to indicate the SST of the slice that is allowed to be accessed by the terminal device and does not include information that is used to indicate the RAT type that is allowed to be used when the terminal device accesses the slice that is allowed to be accessed, for example, a scenario in which an AMF device is selected for the terminal device in the prior art.

Further, after operation S508, the method may further be used to perform the foregoing embodiments shown in FIG. 6 and FIG. 7. Details are not described again.

According to the access method provided in this application, after the AN node device receives the first request message that does not carry the first NSSAI, the AN node device may obtain the second NSSAI from the default AMF device, and select the to-be-accessed first AMF for the terminal device based on the first information included in the second NSSAI. When the AN node device selects the first AMF device for the terminal device, not only the SST of the slice that is allowed to be accessed by the terminal device is considered, but also the RAT type that is allowed to be used when the terminal device accesses the slice that is allowed to be accessed is considered. Therefore, it is ensured that the selected first AMF device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed. Therefore, according to the method in this application, a probability of reselecting an AMF for the terminal device can be reduced in a communication process of the terminal device, thereby reducing signaling overheads and improving communication efficiency.

Figure 9:
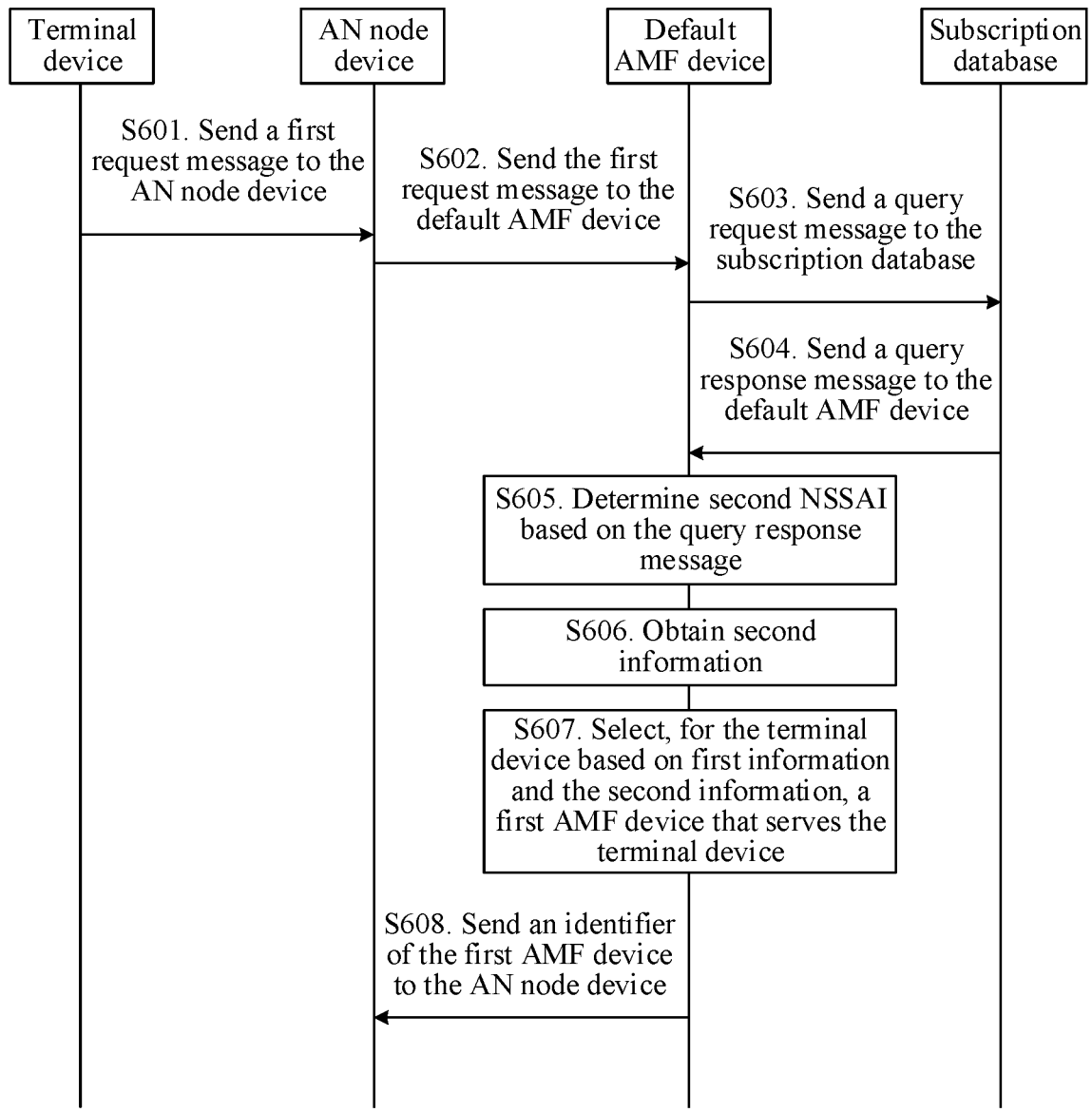
FIG. 9 is a schematic flowchart of still another access method according to this application.

FIG. 9 is a schematic flowchart of still another access method according to this application. As described in the foregoing embodiment, when the foregoing network device is an AMF device, the AMF device may determine first information based on information obtained from a subscription database. In this embodiment, an example in which the AMF device is a default AMF device is used. This embodiment relates to the following process: When a first request message sent by a terminal device does not carry first NSSAI, the default AMF device determines the first information based on the information obtained from the subscription database, to obtain an SST of a slice that is allowed to be accessed by the terminal device and a RAT type that is allowed to be used when the terminal device accesses the slice that is allowed to be accessed, and select an AMF device for the terminal device. As shown in FIG. 9, the method may include the following operations.

In operation S601, the terminal device sends the first request message to an AN node device.

The first request message includes an identifier of the terminal device.

In operation S602, the AN node device sends the first request message to the default AMF device.

In operation S603, the default AMF device sends a query request message to the subscription database.

The query request message includes the identifier of the terminal device.

In operation S604, the subscription database sends a query response message to the default AMF device.

The query response message includes subscription information of the terminal device.

In operation S605, the default AMF device determines second NSSAI based on the query response message.

For descriptions of operations S601 to S605, refer to the foregoing descriptions of S501 to S505. Details are not described herein again.

S In operation 606, the default AMF device obtains second information.

The second information is used to indicate an SST of a slice connected to an access and mobility management function AMF device and a RAT type supported by the connected slice.

For related descriptions of this operation, refer to the descriptions of operation S102. Details are not described again.

In operation S607, the default AMF device selects, for the terminal device based on the first information and the second information, a first AMF device that serves the terminal device.

For example, for related descriptions of this operation, refer to the descriptions of operation S103. Details are not described again.

In operation S608, the default AMF device sends an identifier of the first AMF device to the AN node device.

For example, after the default AMF device selects the first AMF device of the terminal device for the terminal device based on the first information and the second information, the default AMF device may send the identifier of the first AMF device to the AN node device. In this way, the AN node device can forward, based on the identifier of the first AMF device, the first request message sent by the terminal device to the first AMF device, thereby executing a procedure of accessing the first AMF device. In specific implementation, the default AMF device may add the identifier of the first AMF device to a rerouting request message, and send the rerouting request message to the AN node device and the like.

In this case, the default AMF device completes a process of selecting, for the terminal device based on third NSSAI obtained from the subscription database, the first AMF device that serves the terminal device.

It may be understood by a person skilled in the art that, if another device on a network side in a communications system may also receive the first request message sent by the AN node device and select, for the terminal device based on the first request message, the first AMF device that serves the terminal device, the another device may also replace the default AMF device to execute the procedure shown in FIG. 9. Details are not described again.

It should be noted that the method in this embodiment is not only applicable to a scenario in which the first request message sent by the terminal device does not carry the first NSSAI including the first information, but also applicable to a scenario in which the first request message carries the first NSSAI, but the first NSSAI includes only information that is used to indicate the SST of the slice that is allowed to be accessed by the terminal device and does not include information that is used to indicate the RAT type that is allowed to be used when the terminal device accesses the slice that is allowed to be accessed, for example, a scenario in which an AMF device is selected for the terminal device in the prior art.

Further, after operation S608, the method may further be used to perform the foregoing embodiments shown in FIG. 6 and FIG. 7. Details are not described again.

According to the access method provided in this application, after the default AMF device receives the first request message that does not carry the first NSSAI, the default AMF device may obtain the third NSSAI from the subscription database, determine the second NSSAI based on the third NSSAI, and select the to-be-accessed first AMF for the terminal device based on the first information included in the second NSSAI. When the default AMF device selects the first AMF device for the terminal device, not only the SST of the slice that is allowed to be accessed by the terminal device is considered, but also the RAT type that is allowed to be used when the terminal device accesses the slice that is allowed to be accessed is considered. Therefore, it is ensured that the selected first AMF device can support the terminal device in accessing different slices by using a plurality of types of RATs. In this way, the following case may not occur: Because the RAT type that is allowed to be used when the terminal device accesses the slice that is allowed to be accessed is not considered, an AMF accessed by the terminal device when the terminal device initially accesses a network may not meet a requirement that the terminal device accesses different slices by using a plurality of types of RATs, and consequently, a procedure of reselecting an AMF for the terminal device needs to be executed. Therefore, according to the method in this application, a probability of reselecting an AMF for the terminal device can be reduced in a communication process of the terminal device, thereby reducing signaling overheads and improving communication efficiency.

Figure 10:
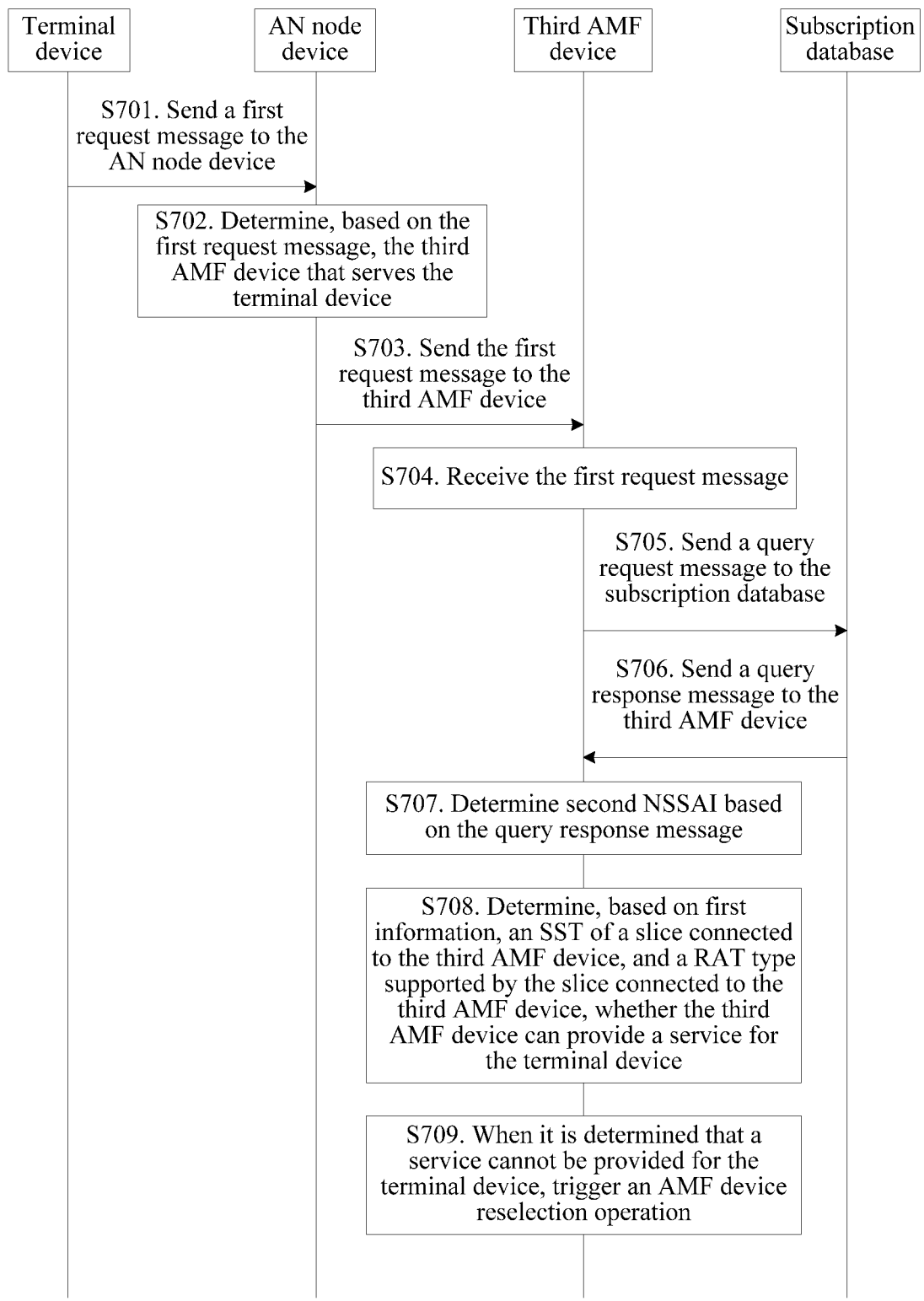
FIG. 10 is a schematic flowchart of still another access method according to this application.

FIG. 10 is a schematic flowchart of still another access method according to this application. When first NSSAI carried in a first request message sent by the foregoing terminal device does not include information used to indicate a RAT type that is allowed to be used when the terminal device accesses a slice that is allowed to be accessed, an AMF device selected by an AN node device for the terminal device based on the first NSSAI may not be a first AMF device. It is assumed that the AMF device selected by the AN node device for the terminal device is not the first AMF device. In this embodiment, the AMF device is a third AMF device. In this case, this embodiment relates to the following process: The third AMF device triggers a process of reselecting an AMF device for the terminal device. As shown in FIG. 10, the method includes the following operations.

In operation S701, the terminal device sends the first request message to the AN node device.

The first request message includes an identifier of the terminal device and the first NSSAI. In this case, the first NSSAI does not include the information used to indicate the RAT type that is allowed to be used when the terminal device accesses the slice that is allowed to be accessed.

In operation S702, the AN node device determines, based on the first request message, the third AMF device that serves the terminal device.

For example, when the AN node device determines a to-be-accessed AMF device for the terminal device, only an SST of a slice that is allowed to be accessed by the terminal device is considered, and a RAT used when the terminal device accesses the slice is not considered. Therefore, the third AMF device may not support a scenario in which the terminal device accesses a plurality of slices by using different RATs.

In operation S703, the AN node device sends the first request message to the third AMF device.

In operation S704, the third AMF device receives the first request message.

In operation S705, the third AMF device sends a query request message to a subscription database.

The query request message includes the identifier of the terminal device.

In operation S706, the subscription database sends a query response message to the third AMF device.

The query response message includes subscription information of the terminal device.

In operation S707, the third AMF device determines second NSSAI based on the query response message.

For descriptions of operations S705 to S707, refer to operations S503 to S505. Details are not described herein again.

In operation S708, the third AMF device determines, based on first information, an SST of a slice connected to the third AMF device, and a RAT type supported by the slice connected to the third AMF device, whether the third AMF device can provide a service for the terminal device.

For example, after determining, based on third NSSAI obtained from the subscription database, the second NSSAI including the first information, the third AMF device may determine, based on the SST of the slice that is allowed to be accessed by the terminal device and the RAT type that is allowed to be used when the terminal device accesses the slice that is allowed to be accessed that are indicated by the first information, the SST of the slice connected to the third AMF device, and the RAT type supported by the slice connected to the third AMF device, whether the third AMF device supports the SST of the slice that is allowed to be accessed by the terminal device and the RAT type that is allowed to be used when the terminal device accesses the SST of the slice that is allowed to be accessed. In this way, it may be further ensured whether the third AMF device selected for the terminal device is correct. In this way, a case of reselecting an AMF device is reduced in a communication process of the terminal device. In one embodiment, the SST of the slice connected to the third AMF device and the RAT type supported by the slice connected to the third AMF device may be preset on the third AMF device, may be obtained by the third AMF device from an access network domain management device, or the like.

When the AN node device determines the third AMF device for the terminal device, only the SST of the slice that is allowed to be accessed by the terminal device is considered, and the RAT used when the terminal device accesses the slice is not considered. Therefore, the third AMF device may not support a scenario in which the terminal device accesses a plurality of slices by using different RATs.

In this embodiment, if it is determined that the third AMF device does not support the SST of the slice that is allowed to be accessed by the terminal device and/or the RAT type that is allowed to be used when the terminal device accesses the SST of the slice that is allowed to be accessed, in other words, the third AMF device cannot provide a service for the terminal device, operation S709 is performed.

In operation S709, when the third AMF device determines that the third AMF device cannot provide a service for the terminal device, the third AMF device triggers an AMF device reselection operation.

For example, when the third AMF device determines that the third AMF device cannot provide a service for the terminal device, the third AMF device triggers an AMF device reselection operation, to determine, for the terminal device, an AMF device that can support the terminal device in accessing different slices by using a plurality of types of RATs, namely, the first AMF device. In this way, a probability of reselecting an AMF for the terminal device is reduced in a communication process of the terminal device.

In one embodiment, the third AMF device may determine the first information based on subscription NSSAI information of the terminal device that is obtained from the subscription database, and execute a procedure of reselecting an AMF device for the terminal device. In specific implementation, the third AMF device may obtain second information to select, for the terminal device based on the first information and the second information, the first AMF device that serves the terminal device, and send an identifier of the first AMF device to the AN node device by using, for example, a rejection message, so that the AN node device can connect the terminal device to the first AMF device. For an implementation in which the third AMF selects, for the terminal device based on the first information and the second information, the first AMF device that serves the terminal device, refer to the descriptions in operations S606 to S608.

In one embodiment, the third AMF device may further send a third request message to a second AMF device (for example, a default AMF device), to trigger the second AMF device to reselect an AMF device for the terminal device. After obtaining the third request message, the second AMF device may perform the operations shown in operations S603 to S607 to obtain the first information and the second information, select, for the terminal device based on the first information and the second information, the first AMF device that serves the terminal device, and send the identifier of the first AMF device to the third AMF device. In this way, the third AMF device may send the identifier of the first AMF device to the AN node device by using, for example, a rejection message, so that the AN node device can connect the terminal device to the first AMF device. In specific implementation, the third request message may be, for example, a rerouting request message. When sending the identifier of the first AMF device to the third AMF device, the second AMF device may send the identifier of the first AMF device to the third AMF device by using a rerouting acceptance message.

In one embodiment, the third AMF device may further send the rejection message to the AN node device, to trigger the AN node device to reselect an AMF device for the terminal device. The AN node device may reselect an AMF device for the terminal device in a manner such as operations S502 to S508 or operations S602 to S608. Details are not described again.

It should be noted that the method in this embodiment is not only applicable to a scenario in which the first NSSAI includes only information used to indicate the SST of the slice that is allowed to be accessed by the terminal device, but does not include information used to indicate the RAT type that is allowed to be used when the terminal device accesses the slice that is allowed to be accessed; but also applicable to the foregoing scenario in which the first NSSAI includes incorrect first information. Implementation principles and technical effects of the two scenarios are similar, and details are not described herein again.

According to the access method provided in this application, when the AN node device connects the terminal device to an incorrect AMF device, the incorrect AMF device may trigger an AMF device reselection operation, to ensure that the terminal device can be connected to the first AMF device that supports the terminal device in accessing different slices by using a plurality of types of RATs. In this way, a probability of reselecting an AMF for the terminal device is reduced in a communication process of the terminal device, thereby reducing signaling overheads and improving communication efficiency.

Figure 11:
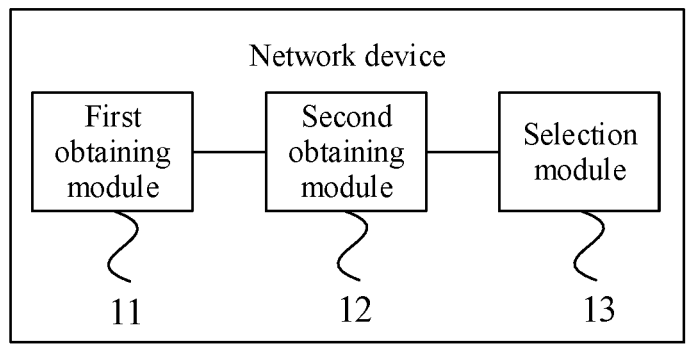
FIG. 11 is a schematic structural diagram of a network device according to this application.

FIG. 11 is a schematic structural diagram of a network device according to this application. As shown in FIG. 11, the network device may include a first obtaining module 11, a second obtaining module 12, and a selection module 13.

The first obtaining module 11 is configured to obtain first information, where the first information is used to indicate a slice/service type SST of a slice that is allowed to be accessed by a terminal device and a radio access technology RAT type that is allowed to be used when the terminal device accesses the slice that is allowed to be accessed.

The second obtaining module 12 is configured to obtain second information, where the second information is used to indicate an SST of a slice connected to an access and mobility management function AMF device and a RAT type supported by the slice connected to the AMF device.

The selection module 13 is configured to select, based on the first information and the second information, a first AMF device that serves the terminal device.

In one embodiment, when the network device is an access network node device, the first obtaining module 11 is specifically configured to obtain first network slice selection assistance information from the terminal device, where the first network slice selection assistance information includes the first information. For example, the first obtaining module 11 is specifically configured to receive a first request message from the terminal device, where the first request message carries the first network slice selection assistance information, and the first network slice selection assistance information is configured network slice selection assistance information or accepted network slice selection assistance information. Alternatively, when the network device is an access network node device, the first obtaining module 11 is specifically configured to obtain second network slice selection assistance information from a second AMF device, where the second network slice selection assistance information includes the first information. For example, the second network slice selection assistance information may be accepted network slice selection assistance information.

In one embodiment, when the network device is a second AMF device, the first obtaining module 11 is specifically configured to: obtain subscription information of the terminal device from a subscription database, and determine the first information based on the subscription information of the terminal device. For example, the subscription information may include an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

In one embodiment, the second obtaining module is specifically configured to: obtain the second information from the AMF device; or obtain the second information from an access network domain management device.

In one embodiment, the selection module is specifically configured to: match the first information and the second information, and select, as the first AMF device, an AMF device that supports the SST of the slice that is allowed to be accessed by the terminal device and the RAT type that is allowed to be used when the terminal device accesses the SST of the slice that is allowed to be accessed.

For the network device provided in this application, when the network device is an AN node device, the network device may perform an action on an AN node device side in the foregoing method embodiments shown in FIG. 4, FIG. 5, and FIG. 8. Implementation principles and technical effects are similar. Details are not described herein again. When the network device is a second AMF device, the network device may perform an action on a default AMF device side in the foregoing method embodiment shown in FIG. 9. Implementation principles and technical effects are similar. Details are not described herein again.

Figure 12:
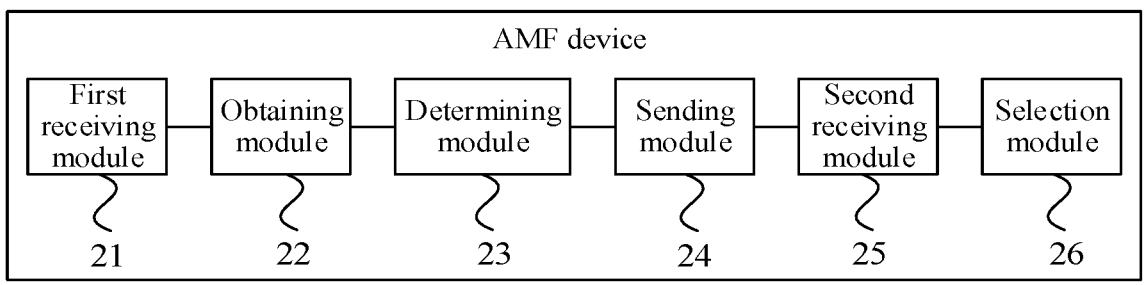
FIG. 12 is a schematic structural diagram of an AMF device according to this application.

FIG. 12 is a schematic structural diagram of an AMF device according to this application. As shown in FIG. 12, the AMF device may include a first receiving module 21, an obtaining module 22, a determining module 23, and a sending module 24.

The first receiving module 21 is configured to receive, from an access network node device, a first request message sent by a terminal device, where the first request message carries an identifier of the terminal device.

The obtaining module 22 is configured to obtain, from a subscription database based on identification information of the terminal device, subscription information corresponding to the identifier of the terminal device. For example, the subscription information includes an SST of a slice to which the terminal device subscribes and a RAT type that is allowed to be used when the terminal device accesses the subscribed slice; or the subscription information includes an SST of a slice that is allowed to be accessed by the terminal device and a RAT type that is allowed to be used when the terminal device accesses the slice that is allowed to be accessed.

The determining module 23 is configured to determine, based on the subscription information, a slice/service type SST of a slice that is allowed to be accessed by the terminal device and a radio access technology RAT type that is allowed to be used when the terminal device accesses the slice that is allowed to be accessed.

The sending module 24 is configured to send a first acceptance message to the terminal device, where the first acceptance message includes the SST of the slice that is allowed to be accessed by the terminal device and the RAT type that is allowed to be used when the terminal device accesses the slice that is allowed to be accessed.

Still referring to FIG. 12, in one embodiment, in another implementation of this application, the AMF device may further include:

a second receiving module 25, configured to: after the sending module 24 sends the acceptance message to the terminal device, receive, from the access network node device, a second request message sent by the terminal device, where the second request message is used to indicate an SST of a slice to be accessed by the terminal device and a RAT type used when the terminal device accesses the to-be-accessed slice; and a selection module 26, configured to select, for the terminal device based on the second request message, an SST of a slice connected to the AMF device, and a RAT type supported by the slice connected to the AMF device, a slice that provides a service.

The AMF device provided in this application may perform the foregoing action on a first AMF device side shown in FIG. 6 and FIG. 7. Implementation principles and technical effects are similar. Details are not described herein again.

Figure 13:
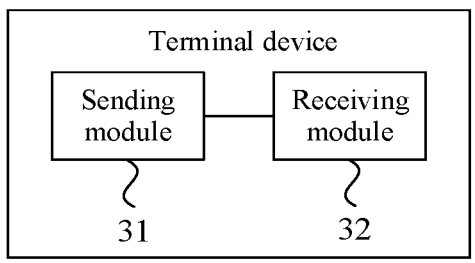
FIG. 13 is a schematic structural diagram of a terminal device according to this application.

FIG. 13 is a schematic structural diagram of a terminal device according to this application. As shown in FIG. 13, the terminal device may include a sending module 31 and a receiving module 32.

The sending module 31 is configured to send a first request message to an access and mobility management function AMF device by using an access network node device, where the first request message carries identification information of the terminal device.

The receiving module 32 is configured to receive, by using the access network node device, a first acceptance message sent by the AMF device, where the first acceptance message includes a slice/service type SST of a slice that is allowed to be accessed by the terminal device and a radio access technology RAT type that is allowed to be used when the terminal device accesses the slice that is allowed to be accessed.

In one embodiment, the first request message further includes first network slice selection assistance information; and the first network slice selection assistance information is configured network slice selection assistance information or accepted network slice selection assistance information.

The terminal device provided in this application may perform the foregoing action on a terminal device side shown in FIG. 5 to FIG. 10. Implementation principles and technical effects are similar. Details are not described herein again.

Figure 14:
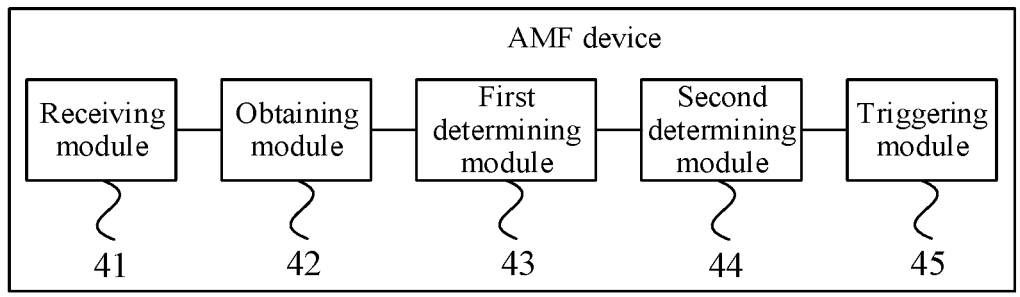
FIG. 14 is a schematic structural diagram of another AMF device according to this application.

FIG. 14 is a schematic structural diagram of another AMF device according to this application. As shown in FIG. 14, the AMF device may include a receiving module 41, an obtaining module 42, a first determining module 43, a second determining module 44, and a triggering module 45.

The receiving module 41 is configured to receive, from an access network node device, a first request message sent by a terminal device, where the first request message carries identification information of the terminal device.

The obtaining module 42 is configured to obtain subscription information of the terminal device from a subscription database based on the identification information of the terminal device.

The first determining module 43 is configured to determine first information based on the subscription information of the terminal device, where the first information is used to indicate a slice/service type SST of a slice that is allowed to be accessed by the terminal device and a radio access technology RAT type that is allowed to be used when the terminal device accesses the slice that is allowed to be accessed. For example, the subscription information includes an SST of a slice to which the terminal device subscribes and a RAT type that is allowed to be used when the terminal device accesses the subscribed slice; or the subscription information includes the SST of the slice that is allowed to be accessed by the terminal device and the RAT type that is allowed to be used when the terminal device accesses the slice that is allowed to be accessed.

The second determining module 44 is configured to determine, based on the first information, an SST of a slice connected to the AMF device, and a RAT type supported by the slice connected to the AMF device, whether the AMF device can provide a service for the terminal device.

The triggering module 45 is configured to: when the AMF device cannot provide a service for the terminal device, trigger an AMF device reselection operation.

In one embodiment, the triggering module 45 is specifically configured to: reselect an AMF device for the terminal device based on the first information; send a third request message to a second AMF device, where the third request message is used to instruct the second AMF device to reselect an AMF device for the terminal device; or send a rejection message to the access network node device, where the rejection message is used to instruct the access network node device to reselect an AMF device for the terminal device.

The AMF device provided in this application may perform the foregoing action on a third AMF device side shown in FIG. 10. Implementation principles and technical effects are similar. Details are not described herein again.

It should be noted that, the foregoing sending module may be a transmitter in actual implementation, and the receiving module may be a receiver in actual implementation. Division of the determining module, the obtaining module, the selection module, and the triggering module is merely logical function division. In actual implementation, all or some of modules on a device may be integrated into one physical entity, or may be physically separated. In addition, all the modules on a device may be implemented by invoking software by a processing element; or all the modules may be implemented by hardware; or some modules may be implemented by invoking software by a processing element, and some modules may be implemented by hardware. For example, the determining module may be an independently disposed processing element, or may be integrated into a chip of the foregoing apparatus for implementation. In addition, the determining module may alternatively be stored in a form of program code in a memory of one of the foregoing apparatus, and is invoked by a processing element of the apparatus, to execute the functions of the determining module. Implementation of other modules is similar to the foregoing implementation. In addition, all or some of the modules on a device may be integrated, or may be implemented independently. The processing element herein may be an integrated circuit with a signal processing capability. In an implementation process, operations in the foregoing methods or the foregoing modules on a device can be implemented by using a hardware integrated logic circuit in the processing element, or by using instructions in a form of software.

For example, the foregoing modules may be configured as one or more integrated circuits that implement the foregoing methods, for example, one or more application-specific integrated circuits (ASIC), one or more microprocessors (DSP), or one or more field programmable gate arrays (FPGA). For another example, when one of the foregoing modules is implemented by scheduling the program code by the processing element, the processing element may be a general-purpose processor, for example, a central processing unit (CPU), or another processor that can invoke the program code. For still another example, these modules on a device may be integrated together and implemented in a system-on-a-chip (SOC) form.

Figure 15:
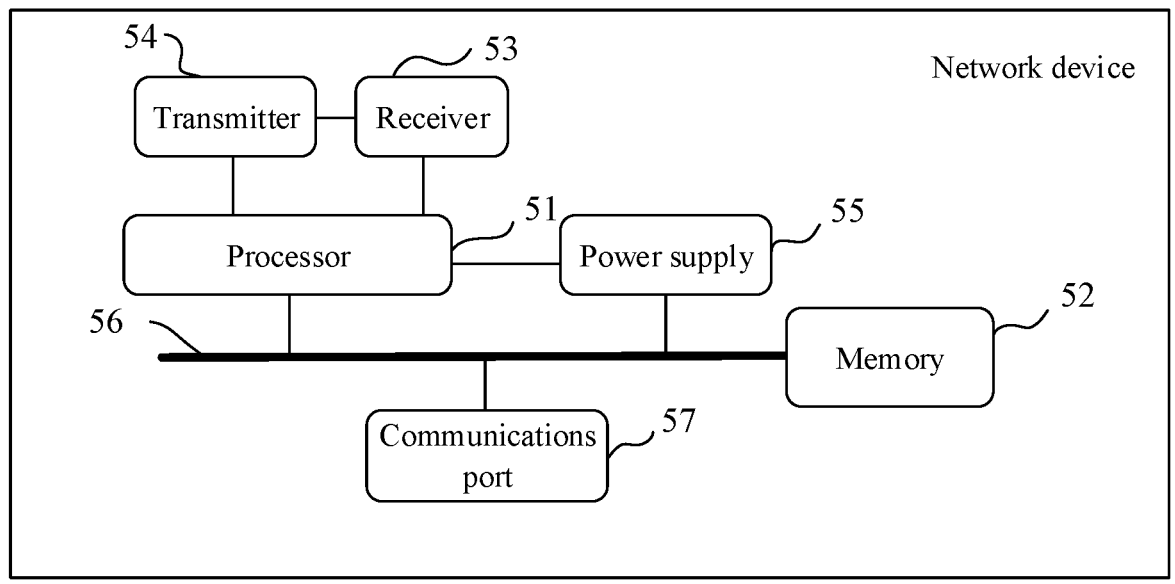
FIG. 15 is a schematic structural diagram of another network device according to this application.

FIG. 15 is a schematic structural diagram of another network device according to this application. As shown in FIG. 15, the network device may include a processor 51 (for example, a CPU), a memory 52, a receiver 53, and a transmitter 54. Both the receiver 53 and the transmitter 54 are coupled to the processor 51. The processor 51 controls a receiving action of the receiver 53, and the processor 51 controls a sending action of the transmitter 54. The memory 52 may include a high-speed RAM memory, or may include a non-volatile memory NVM, for example, at least one magnetic disk storage. The memory 52 may store various instructions, to complete various processing functions and implement the method operations of this application. In one embodiment, the network device in this application may further include a power supply 55, a communications bus 56, and a communications port 57. The receiver 53 and the transmitter 54 may be integrated into a transceiver of the network device, or may be an independent transceiver antenna on the network device. The communications bus 56 is configured to implement communications connections between the components. The communications port 57 is configured to implement connection and communication between the network device and another peripheral.

In this application, when the network device is an AN node device, the memory 52 is configured to store computer executable program code. The program code includes an instruction. When the processor 51 executes the instruction, the instruction enables the network device to execute an action on an AN node device side shown in FIG. 4, FIG. 5, and FIG. 8. Implementation principles and technical effects are similar. Details are not described herein again.

In this application, when the network device is a second AMF device, the memory 52 is configured to store computer executable program code. The program code includes an instruction. When the processor 51 executes the instruction, the instruction enables the network device to execute an action on a default AMF device side shown in FIG. 9. Implementation principles and technical effects are similar. Details are not described herein again.

Figure 16:
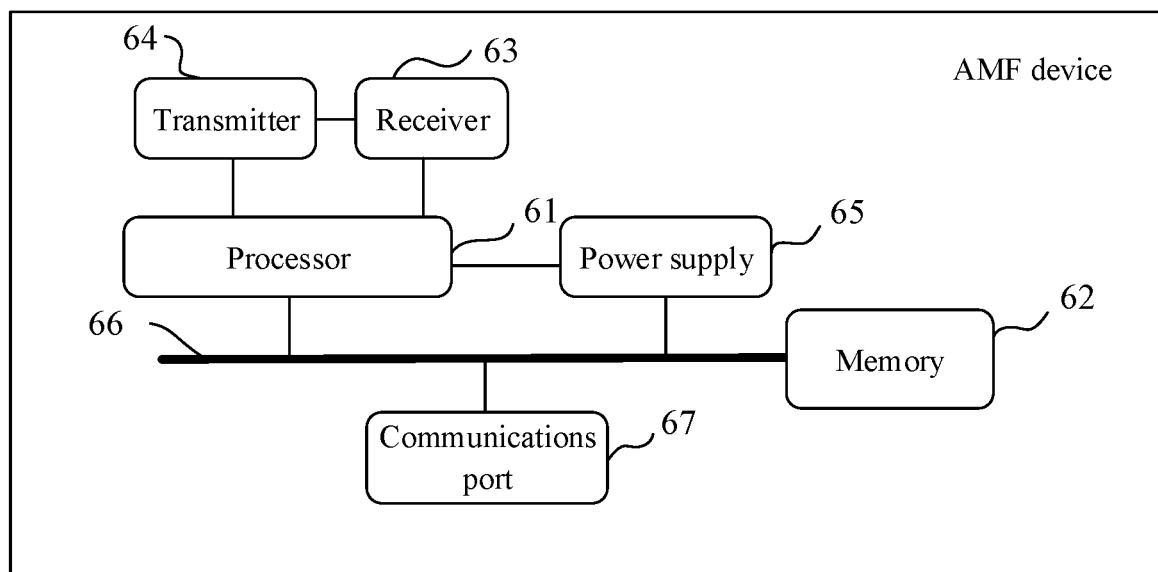
FIG. 16 is a schematic structural diagram of still another AMF device according to this application.

FIG. 16 is a schematic structural diagram of still another AMF device according to this application. As shown in FIG. 16, the AMF device may include a processor 61 (for example, a CPU), a memory 62, a receiver 63, and a transmitter 64. Both the receiver 63 and the transmitter 64 are coupled to the processor 61. The processor 61 controls a receiving action of the receiver 63, and the processor 61 controls a sending action of the transmitter 64. The memory 62 may include a high-speed RAM memory, or may include a non-volatile memory NVM, for example, at least one magnetic disk storage. The memory 62 may store various instructions, to complete various processing functions and implement the method operations of this application. In one embodiment, the AMF device in this application may further include a power supply 65, a communications bus 66, and a communications port 67. The receiver 63 and the transmitter 64 may be integrated into a transceiver of the AMF device, or may be an independent transceiver antenna on the AMF device. The communications bus 66 is configured to implement communications connections between the components. The communications port 67 is configured to implement connection and communication between the AMF device and another peripheral.

In this application, the memory 62 is configured to store computer executable program code. The program code includes an instruction. When the processor 61 executes the instruction, the instruction enables the AMF device to execute an action on a first AMF device side shown in FIG. 6 and FIG. 7. Implementation principles and technical effects are similar. Details are not described herein again.

Figure 17:
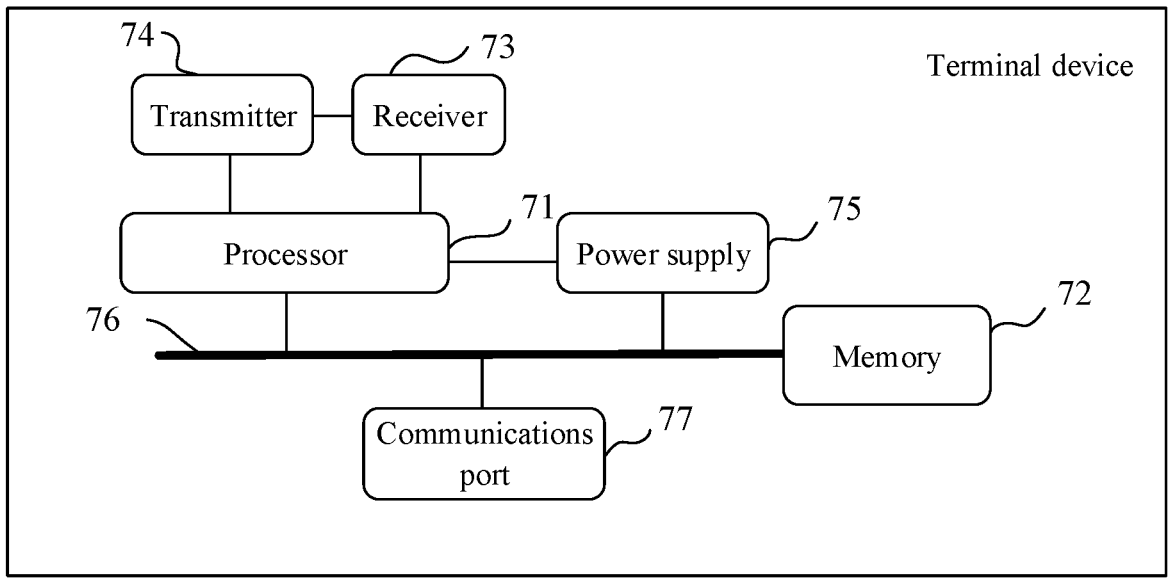
FIG. 17 is a schematic structural diagram of another terminal device according to this application.

FIG. 17 is a schematic structural diagram of another terminal device according to this application. As shown in FIG. 17, the terminal device may include a processor 71 (for example, a CPU), a memory 72, a receiver 73, and a transmitter 74. Both the receiver 73 and the transmitter 74 are coupled to the processor 71. The processor 71 controls a receiving action of the receiver 73, and the processor 71 controls a sending action of the transmitter 74. The memory 72 may include a high-speed RAM memory, or may include a non-volatile memory NVM, for example, at least one magnetic disk storage. The memory 72 may store various instructions, to complete various processing functions and implement the method operations of this application. In one embodiment, the terminal device in this application may further include a power supply 75, a communications bus 76, and a communications port 77. The receiver 73 and the transmitter 74 may be integrated into a transceiver of the terminal device, or may be an independent transceiver antenna on the terminal device. The communications bus 76 is configured to implement communications connections between the components. The communications port 77 is configured to implement connection and communication between the terminal device and another peripheral.

In this application, the memory 72 is configured to store computer executable program code. The program code includes an instruction. When the processor 71 executes the instruction, the instruction enables the terminal device to execute an action on a terminal device side shown in FIG. 5 to FIG. 10. Implementation principles and technical effects are similar. Details are not described herein again.

Figure 18:
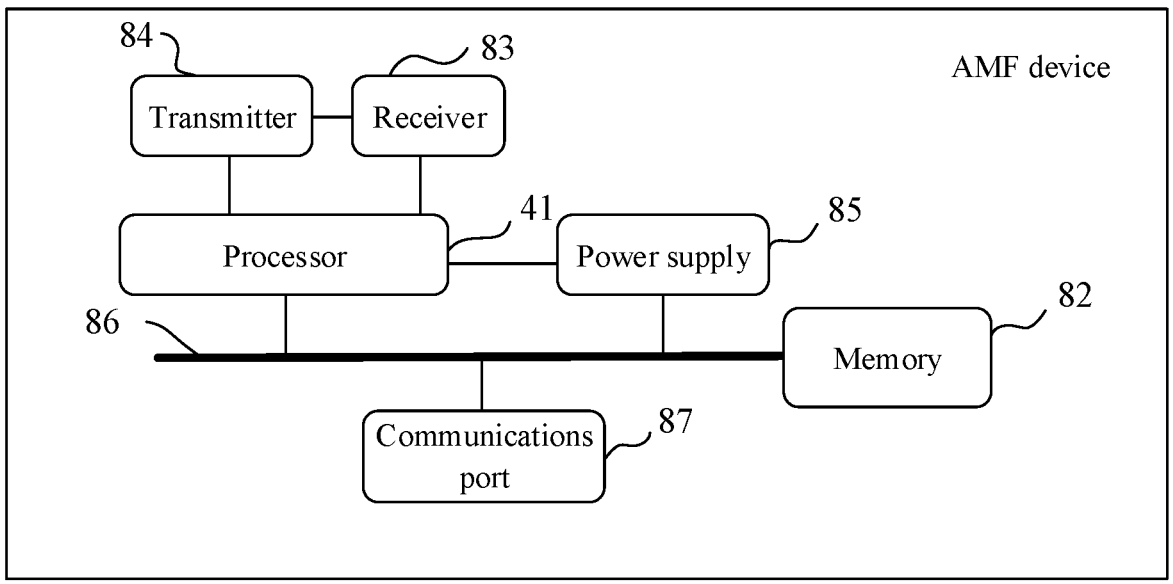
FIG. 18 is a schematic structural diagram of still another terminal device according to this application.

FIG. 18 is a schematic structural diagram of another terminal device according to this application. As shown in FIG. 18, the terminal device may include a processor 81 (for example, a CPU), a memory 82, a receiver 83, and a transmitter 84. Both the receiver 83 and the transmitter 84 are coupled to the processor 81. The processor 81 controls a receiving action of the receiver 83, and the processor 81 controls a sending action of the transmitter 84. The memory 82 may include a high-speed RAM memory, or may include a non-volatile memory NVM, for example, at least one magnetic disk storage. The memory 82 may store various instructions, to complete various processing functions and implement the method operations of this application. In one embodiment, the terminal device in this application may further include a power supply 85, a communications bus 86, and a communications port 87. The receiver 83 and the transmitter 84 may be integrated into a transceiver of the terminal device, or may be an independent transceiver antenna on the terminal device. The communications bus 86 is configured to implement communications connections between the components. The communications port 87 is configured to implement connection and communication between the terminal device and another peripheral.

In this application, the memory 82 is configured to store computer executable program code. The program code includes an instruction. When the processor 81 executes the instruction, the instruction enables a third AMF device to execute an action on a third AMF device side shown in FIG. 10. Implementation principles and technical effects are similar. Details are not described herein again.

Figure 19:
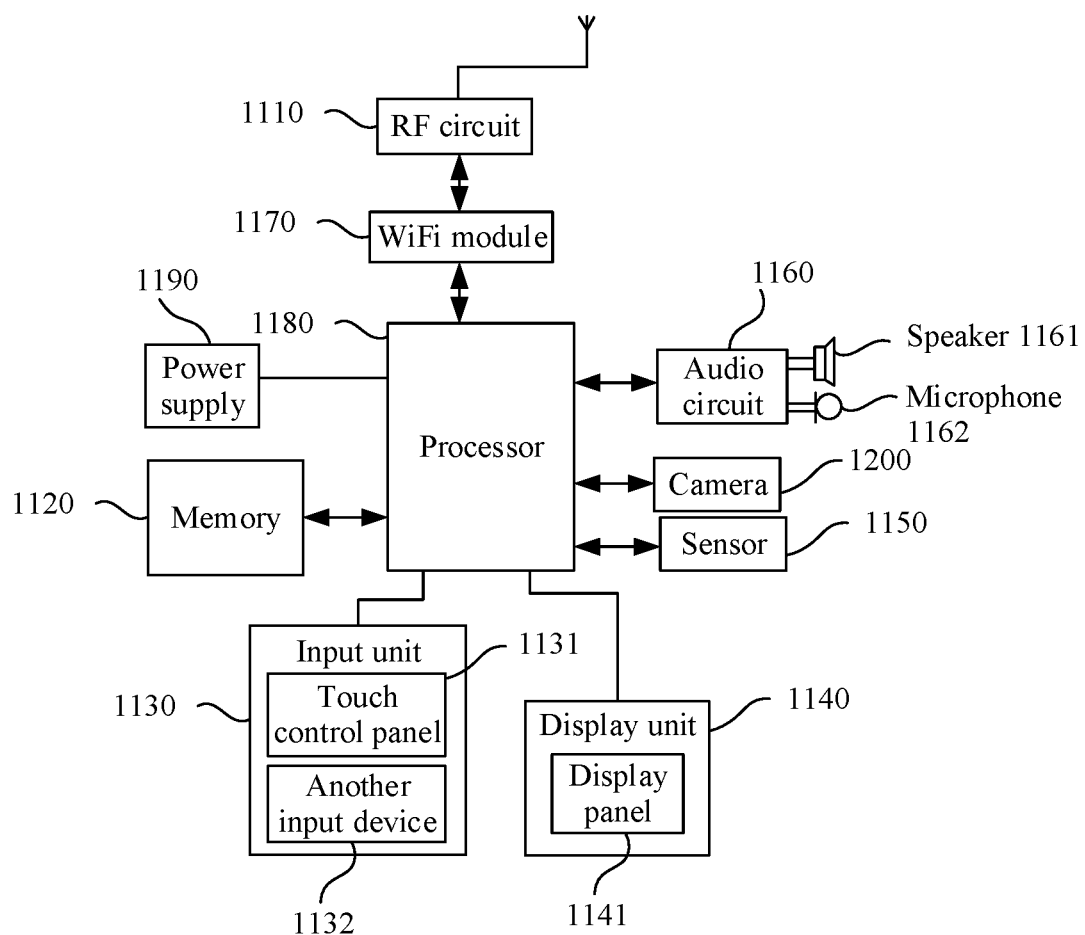
FIG. 19 is a structural block diagram of a terminal device when the terminal device is a mobile phone according to this application.

Similar to the foregoing embodiment, the terminal device in this application may be a wireless terminal such as a mobile phone or a tablet computer. Therefore, in an example in which the terminal device is a mobile phone, FIG. 19 is a structural block diagram of a terminal device when the terminal device is a mobile phone according to this application. Referring to FIG. 19, the mobile phone may include components such as a radio frequency (RF) circuit 1110, a memory 1120, an input unit 1130, a display unit 1140, a sensor 1150, an audio circuit 1160, a wireless fidelity (WiFi) module 1170, a processor 1180, and a power supply 1190. A person skilled in the art may understand that a structure of the mobile phone shown in FIG. 19 does not constitute a limitation on the mobile phone, and the mobile phone may include more or fewer components than those shown in the figure, combine some components, or have different component arrangements.

The following describes each component of the mobile phone in detail with reference to FIG. 19.

The RF circuit 1110 may be configured to: receive and send information, or receive and send a signal in a call process. For example, after receiving downlink information of a base station, the RF circuit 1110 sends the downlink information to the processor 1180 for processing. In addition, the RF circuit 1110 sends uplink data to the base station. The RF circuit usually includes but is not limited to an antenna, at least one amplifier, a transceiver, a coupler, a low noise amplifier (LNA), a duplexer, and the like. In addition, the RF circuit 1110 may further communicate with a network and another device through wireless communication. Any communications standard or protocol may be used for the wireless communication, including but being not limited to global system for mobile communications (GSM), a general packet radio service (GPRS), code division multiple access (CDMA), wideband code division multiple access (WCDMA), LTE, an e-mail, a short message service (SMS), and the like.

The memory 1120 may be configured to store a software program and a module. The processor 1180 executes various functional applications of the mobile phone and processes data by running the software program and the module stored in the memory 1120. The memory 1120 may mainly include a program storage area and a data storage area. The program storage area may store an operating system, an application program required by at least one function (such as a sound playing function or an image playing function), and the like. The data storage area may store data (such as audio data or an address book) created based on use of the mobile phone, and the like. In addition, the memory 1120 may include a high speed random access memory, or may include a non-volatile memory, such as at least one magnetic disk storage device, a flash memory device, or another volatile solid-state storage device.

The input unit 1130 may be configured to: receive entered digital or character information, and generate key signal input related to user setting and function control of the mobile phone. Specifically, the input unit 1130 may include a touch panel 1131 and another input device 1132. The touch panel 1131, also referred to as a touchscreen, may collect a touch operation performed by a user on or near the touch panel (for example, an operation performed by the user on the touch panel 1131 or near the touch panel 1131 by using any proper object or accessory such as a finger or a stylus), and drive a corresponding connection apparatus based on a preset program. In one embodiment, the touch panel 1131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and then sends the touch point coordinates to the processor 1180. Moreover, the touch controller can receive and execute a command sent by the processor 1180. In addition, the touch panel 1131 may be implemented in a plurality of types such as a resistive type, a capacitive type, an infrared ray, and a surface acoustic wave. In addition to the touch panel 1131, the input unit 1130 may further include another input device 1132. Specifically, the another input device 1132 may include, but is not limited to, one or more of a physical keyboard, a function key (such as a volume control key or an on/off key), a trackball, a mouse, and a joystick.

The display unit 1140 may be configured to display information entered by the user or information provided for the user, and various menus of the mobile phone. The display unit 1140 may include a display panel 1141. In one embodiment, the display panel 1141 may be configured in a form of a liquid crystal display (LCD), an organic light-emitting diode (OLED), or the like. Further, the touch panel 1131 may cover the display panel 1141. When detecting the touch operation on or near the touch panel 1131, the touch panel 1131 transfers the touch operation to the processor 1180 to determine a type of a touch event. Then, the processor 1180 provides corresponding visual output on the display panel 1141 based on the type of the touch event. In FIG. 10, the touch panel 1131 and the display panel 1141 are used as two independent components to implement input and output functions of the mobile phone. However, in some embodiments, the touch panel 1131 and the display panel 1141 may be integrated to implement the input and output functions of the mobile phone.

The mobile phone may further include at least one sensor 1150 such as a light sensor, a motion sensor, or another sensor. Specifically, the optical sensor may include an ambient light sensor and a proximity sensor. The ambient light sensor may adjust luminance of the display panel 1141 based on brightness of ambient light, and the optical sensor may turn off the display panel 1141 and/or become backlight when the mobile phone approaches an ear. As one type of motion sensor, an acceleration sensor may detect values of acceleration in all directions (usually, three axes), may detect a value and a direction of gravity in a static mode, and may be used in an application for identifying a mobile phone posture (for example, screen switching between a landscape mode and a portrait mode, a related game, or magnetometer posture calibration), a vibration-recognition related function (such as a pedometer or a knock), and the like. For other sensors such as a gyroscope, a barometer, a hygrometer, a thermometer, and an infrared sensor that may be further disposed on the mobile phone, details are not described herein.

The audio circuit 1160, a speaker 1161, and a microphone 1162 may provide an audio interface between the user and the mobile phone. The audio circuit 1160 may convert received audio data into an electrical signal and then transmit the electrical signal to the loudspeaker 1161, and the loudspeaker 1161 converts the electrical signal into a sound signal for output. In addition, the microphone 1162 converts a collected sound signal into an electrical signal. The audio circuit 1160 receives the electrical signal, converts the electrical signal into audio data, and then outputs the audio data to the processor 1180 for processing. After the processing, the audio data is sent to, for example, another mobile phone by using the RF circuit 1110, or the audio data is output to the memory 1120 for further processing.

WiFi is a short-range wireless transmission technology. By using the WiFi module 1170, the mobile phone can help the user receive and send an email, browse a web page, access streaming media, and the like. The WiFi module 1170 provides wireless broadband Internet access to the user. Although FIG. 19 shows the WiFi module 1170, it can be understood that the WiFi module 1170 is not a necessary part of the mobile phone and may certainly be omitted as required provided that the essence of this application is not changed.

As a control center of the mobile phone, the processor 1180 connects various parts of the entire mobile phone by using various interfaces and lines, and performs various functions of the mobile phone and processes data by running or executing the software program and/or the module stored in the memory 1120 and by invoking data stored in the memory 1120, to perform overall monitoring on the mobile phone. In one embodiment, the processor 1180 may include one or more processing units. For example, an application processor and a modem processor may be integrated into the processor 1180, where the application processor mainly processes an operating system, a user interface, an application program, or the like; and the modem processor mainly processes radio communication. It may be understood that, alternatively, the modem processor may not be integrated into the processor 1180.

The mobile phone further includes the power supply 1190 (such as a battery) that supplies power to each component. In one embodiment, the power supply may be logically connected to the processor 1180 by using a power management system, to implement functions such as charging and discharging management and power consumption management by using the power management system.

The mobile phone may further include a camera 1200. The camera may be a front-facing camera or a rear-facing camera. Although not shown, the mobile phone may further include a Bluetooth module, a GPS module, and the like, and details are not described herein.

In this application, the processor 1180 included in the mobile phone may be configured to perform the foregoing access method embodiment. An implementation principle and a technical effect of this embodiment are similar to those of the foregoing method embodiment, and details are not described herein again.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedures or functions according to the embodiments of the present invention are generated. The computer may be a general-purpose computer, a dedicated computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another web site, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device integrating one or more usable media, such as a server or a data center. The usable medium may be a magnetic medium (for example, a floppy disk, a hard disk, or a magnetic tape), an optical medium (for example, DVD), a semiconductor medium (for example, a solid-state disk (SSD)), or the like.

What is claimed is:

1. An access method, comprising:
   obtaining, by a network device, first information from a terminal device, the first information indicating a plurality of network slices configured to be accessed by the terminal device, a slice/service type (SST) of each of the plurality of network slices, and a radio access technology (RAT) type supported by that network slice;
   obtaining, by the network device connected to a plurality of access and mobility management function (AMF) devices, second information, wherein the second information indicates an SST of each network slice connected to each of the plurality of AMF devices, and an RAT type supported by that network slice;
   selecting, by the network device, an AMF device from the plurality of AMF devices to service the terminal device based on a matching between the first information and the second information, wherein the selected AMF device is connected to a first network slice and a second network slice, wherein the first network slice supports a first SST and a first RAT type, and the second network type supports a second SST and a second RAT type, wherein the terminal device is configured to access the first network slice through the selected AMF device in response to the terminal device requesting a network slice supporting the first SST and the first RAT type, and to access the second network slice through the same AMF device in response to the terminal device requesting access to a network slice supporting the second SST and the second RAT type.

2. The method according to claim 1, wherein the network device is an access network node device, and obtaining the first information comprises:
   obtaining, by the network device, first network slice selection assistance information from the terminal device, wherein the first network slice selection assistance information comprises the first information; or
   obtaining, by the network device, second network slice selection assistance information from a second AMF device, wherein the second network slice selection assistance information comprises the first information.

3. The method according to claim 2, wherein obtaining the first network slice selection assistance information from the terminal device comprises:
   receiving, by the network device, a first request message from the terminal device, wherein the first request message carries the first network slice selection assistance information, and wherein the first network slice selection assistance information is configured network slice selection assistance information or accepted network slice selection assistance information.

4. The method according to claim 2, wherein the second network slice selection assistance information is accepted network slice selection assistance information.

5. The method according to claim 1, wherein obtaining the second information comprises:
   obtaining, by the network device, the second information from the AMF device; or
   obtaining, by the network device, the second information from an access network domain management device.

6. The method according to claim 1, wherein the network device is a second AMF device, and obtaining the first information comprises:
   obtaining, by the network device, subscription information of the terminal device from a subscription database; and
   determining, by the network device, the first information based on the subscription information of the terminal device.

7. The method according to claim 6,
   wherein the subscription information comprises an SST of a subscribed slice to which the terminal device subscribes, and a RAT type that is allowed to be used when the terminal device accesses the subscribed slice; or
   wherein the subscription information comprises the SST of the slice that is allowed to be accessed by the terminal device and the RAT type that is allowed to be used when the terminal device accesses the slice that is allowed to be accessed.

8. A network device, wherein the network device comprises:
   an interface;
   a processor; and
   a non-transitory computer-readable storage medium storing a program to be executed by the processor, the program including instructions to:
   obtain, by a network device, first information from a terminal device, the first information indicating a plurality of network slices configured to be accessed by the terminal device, a slice/service type (SST) of each of the plurality of network slices, and a radio access technology (RAT) type supported by that network slice;

obtain, by the network device connected to a plurality of access and mobility management function (AMF) devices, second information, wherein the second information indicates an SST of each network slice connected to each of the plurality of AMF device, and an RAT type supported by that network slice;

select, by the network device, an AMF device from the plurality of AMF devices to service the terminal device based on a matching between the first information and the second information, wherein the selected AMF device is connected to a first network slice and a second network slice, wherein the first network slice supports a first SST and a first RAT type, and the second network type supports a second SST and a second RAT type, wherein the terminal is configured to accesses the first network slice through the selected AMF device in response to the terminal device requesting a network slice supporting the first SST and the first RAT type, and to access, the second network slice through the same AMF device in response to the terminal device requesting access to a network slice supporting the second SST and the second RAT type.

9. The network device according to claim 8,
wherein the network device is an access network node device; and
wherein the program includes instructions to: obtain first network slice selection assistance information from the terminal device, wherein the first network slice selection assistance information comprises the first information; or obtain second network slice selection assistance information from a second AMF device, wherein the second network slice selection assistance information comprises the first information.

10. The network device according to claim 9,
wherein the program includes instructions to: receive a first request message from the terminal device,
wherein the first request message carries the first network slice selection assistance information, and
wherein the first network slice selection assistance information is configured network slice selection assistance information or accepted network slice selection assistance information.

11. The network device according to claim 9, wherein the second network slice selection assistance information is accepted network slice selection assistance information.

12. The network device according to claim 8,
wherein the network device is a second AMF device; and
wherein the program includes instructions to: obtain subscription information of the terminal device from a subscription database, and determine the first information based on the subscription information of the terminal device.

13. The network device according to claim 12,
wherein the subscription information comprises an SST of a subscribed slice to which the terminal device subscribes and a RAT type that is allowed to be used when the terminal device accesses the subscribed slice; or
wherein the subscription information comprises the SST of the slice that is allowed to be accessed by the terminal device and the RAT type that is allowed to be used when the terminal device accesses the slice that is allowed to be accessed.

14. A non-transitory computer-readable medium for storing instructions, which when executed by a processor, cause the processor to perform a method, the method comprising:

obtaining, by a network device, first information from a terminal device, the first information indicating a plurality of network slices configured to be accessed by the terminal device, a slice/service type (SST) of each of the plurality of network slices, and a radio access technology (RAT) type supported by that network slice;

obtaining, by the network device connected to a plurality of access and mobility management function (AMF) devices, second information, wherein the second information indicates an SST of each network slice connected to each of the plurality of AMF devices, and an RAT type supported by that network slice;

selecting, by the network device, an AMF device from the plurality of AMF devices to service the terminal device based on a matching between the first information and the second information, wherein the selected AMF device is connected to a first network slice and a second network slice, wherein the first network slice supports a first SST and a first RAT type, and the second network type supports a second SST and a second RAT type, wherein the terminal device is configured to access the first network slice through the selected AMF device in response to the terminal device requesting a network slice supporting the first SST and the first RAT type, and to access the second network slice through the same AMF device in response to the terminal device requesting access to a network slice supporting the second SST and the second RAT type.

15. The non-transitory computer-readable medium according to claim 14, wherein the network device is an access network node device, and obtaining the first information comprises:

obtaining, by the network device, first network slice selection assistance information from the terminal device, wherein the first network slice selection assistance information comprises the first information; or obtaining, by the network device, second network slice selection assistance information from a second AMF device, wherein the second network slice selection assistance information comprises the first information.

16. The non-transitory computer-readable medium according to claim 15, wherein obtaining the first network slice selection assistance information from the terminal device comprises:

receiving, by the network device, a first request message from the terminal device, wherein the first request message carries the first network slice selection assistance information, and wherein the first network slice selection assistance information is configured network slice selection assistance information or accepted network slice selection assistance information.

17. The non-transitory computer-readable medium according to claim 15, wherein the second network slice selection assistance information is accepted network slice selection assistance information.

18. The non-transitory computer-readable medium according to claim 14, wherein obtaining the second information comprises:

obtaining, by the network device, the second information from the AMF device; or obtaining, by the network device, the second information from an access network domain management device.

19. The non-transitory computer-readable medium according to claim 14, wherein the subscription information comprises an SST of a subscribed slice to which the terminal device subscribes, and a RAT type that is allowed to be used when the terminal device accesses the subscribed slice; or wherein the subscription information comprises the SST of the slice that is allowed to be accessed by the terminal device and the RAT type that is allowed to be used when the terminal device accesses the slice that is allowed to be accessed.

* * * * *